(12) United States Patent
Desai et al.

(10) Patent No.: US 10,938,947 B2
(45) Date of Patent: Mar. 2, 2021

(54) SLO I/O DELAY PREDICTION

(71) Applicant: EMC IP Holding Company LLC, Hopkinton, MA (US)

(72) Inventors: Dharmesh J. Desai, Karnataka (IN); Raghuram Adabala, Tewksbury, MA (US); Sichao Zhu, Natick, MA (US); Arieh Don, Newton, MA (US); Jaeyoo Jung, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 118 days.

(21) Appl. No.: 16/245,762

(22) Filed: Jan. 11, 2019

(65) Prior Publication Data
US 2020/0228625 A1 Jul. 16, 2020

(51) Int. Cl.
*H04L 29/08* (2006.01)
*H04L 12/24* (2006.01)
*G06F 3/06* (2006.01)

(52) U.S. Cl.
CPC ............ *H04L 67/322* (2013.01); *G06F 3/067* (2013.01); *G06F 3/0611* (2013.01); *G06F 3/0659* (2013.01); *H04L 41/5009* (2013.01); *H04L 41/5022* (2013.01)

(58) Field of Classification Search
CPC ............... H04L 67/322; H04L 41/5009; H04L 41/5022; G06F 3/0611; G06F 3/0659; G06F 3/067
See application file for complete search history.

(56) References Cited

U.S. PATENT DOCUMENTS

| 8,584,128 | B1 | 11/2013 | Don et al. | |
| 9,465,550 | B1 * | 10/2016 | Lippitt | G06F 3/0659 |
| 2017/0206107 | A1 * | 7/2017 | Guha | G06F 3/0647 |

* cited by examiner

*Primary Examiner* — SM A Rahman
(74) *Attorney, Agent, or Firm* — Muirhead and Saturnelli, LLC

(57) ABSTRACT

Techniques for processing I/O operations may include: receiving an I/O operation directed to a logical device having an associated service level objective with a target I/O response time; performing first processing that determines an estimated response time for the I/O operation, and determining, based on the estimated response time for the I/O operation and the associated service level objective, whether to delay the I/O operation by an additional amount of time thereby increasing a measured response time for the I/O operation by the additional amount. The first processing may include determining a fixed baseline amount of time for the I/O operation; determining a cumulative amount of time estimated to service pending I/O operation queued for service prior to the I/O operation; and determining an expected service time estimated for servicing the I/O operation. Moving averages maintained for different I/O types and sizes may be used in determining I/O service times.

20 Claims, 15 Drawing Sheets

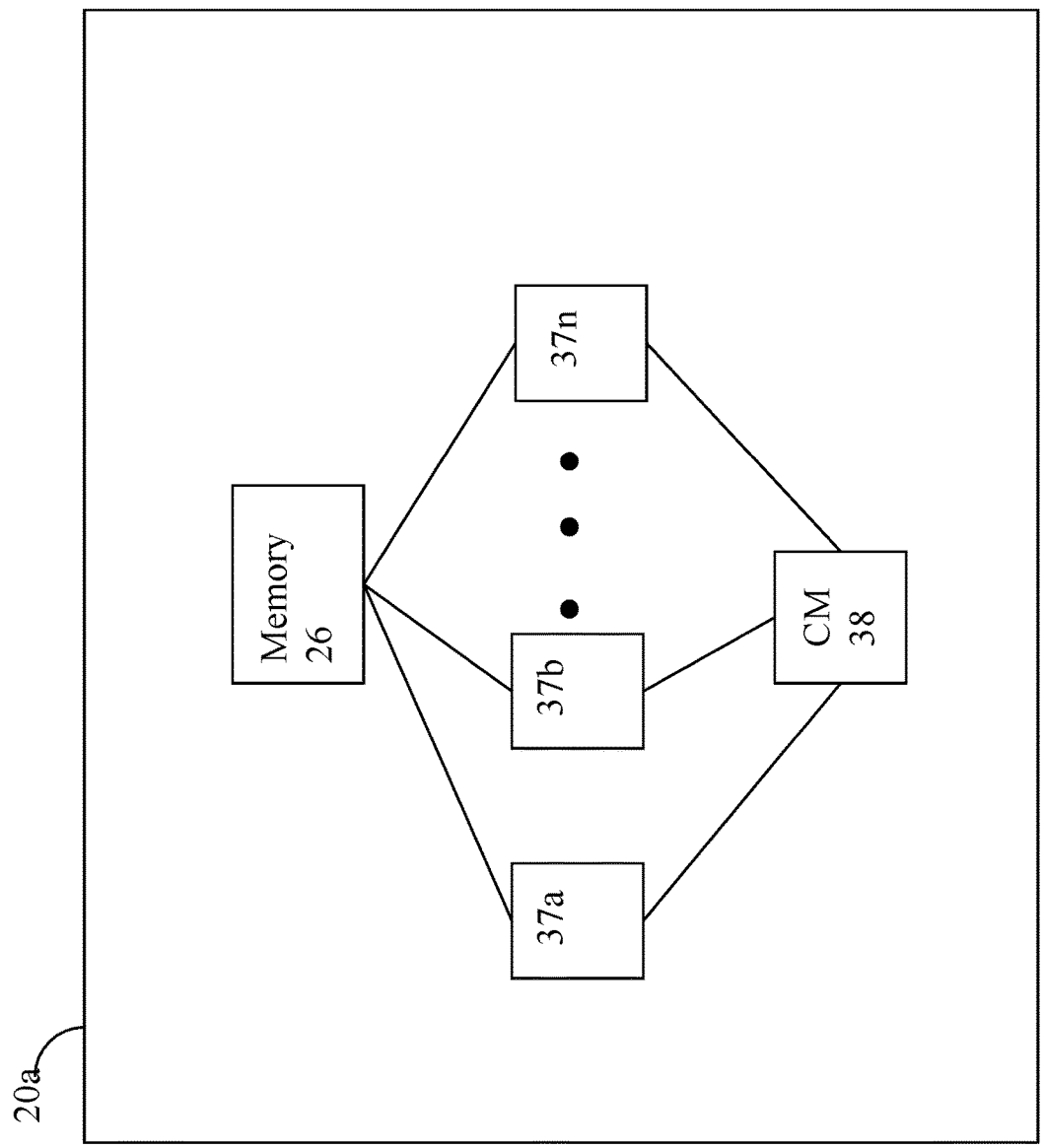

| I/O type 510 | I/O size 512 | Average service time 514 |
|---|---|---|
| Read Hit | 4K | T1 microseconds |
|  | 8K | T2 microseconds |
|  | .. | .. |
| Read Miss | 4K | T11 microseconds |
|  | 8K | T12 microseconds |
|  | .. | .. |
| Write | 4K | T21 microseconds |
|  | 8K | T22 microseconds |
|  | .. | .. |

| Time of Arrival 710 | Estimated service or execution time 711 | Time at which request becomes urgent 712 | Time Delay 713 | Other Request information 714 |

SLO I/O DELAY PREDICTION

BACKGROUND

Technical Field

This application generally relates to data storage and, in particular, I/O processing and service level objectives (SLOs).

Description of Related Art

Data storage systems may include resources used by one or more host systems. Data storage systems and host systems may be interconnected by one or more communication connections such as in a network. These resources may include, for example, data storage devices such as those included in the data storage systems by Dell Inc. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of processing I/O operations comprising: receiving an I/O operation directed to a logical device having an associated service level objective with a target I/O response time; performing first processing that determines an estimated response time for the I/O operation, the first processing including: determining a first time denoting a fixed baseline amount of time for the I/O operation; determining a second time denoting a cumulative amount of time estimated to service pending I/O operation queued for service prior to the I/O operation; determining a third time denoting an expected service time estimated for servicing the I/O operation; and determining the estimated response time for the I/O operation as a sum of the first time, the second time and the third time; and determining, based on the estimated response time for the I/O operation and the associated service level objective, whether to delay the I/O operation by an additional amount of time thereby increasing a measured response time for the I/O operation by the additional amount. The I/O operation may be received at a data storage system from a host. The first time may include an internal baseline time for servicing the I/O operation within the data storage system. The I/O operation may have an associated I/O type and I/O size, and wherein the internal baseline time may be selected, in accordance with the I/O type and the I/O size, from a table of internal baseline times. The associated type may be one of read hit, read miss or write. The first time may include an external baseline time for transmitting the I/O operation and associated I/O operation data between the host and data storage system. The I/O operation may have an associated I/O type and I/O size, and wherein the external baseline time may be selected, in accordance with the I/O type and the I/O size, from a table of external baseline times. The I/O type may be one of read or write. The second time may be determined in accordance with a number of pending I/O operations queued for execution or servicing prior to the I/O operation and an estimated service time associated with each of the pending I/O operations. The method may include maintaining a first plurality of average service times, wherein each of the first plurality of average service times denotes an average service time for servicing I/O operations of a particular I/O type and a particular I/O size within the data storage system; and determining the estimated service time associated with each of the pending I/O operations using a selected one of the first plurality of average service times having an I/O type and an I/O size matching an I/O type and an I/O size of said each pending I/O operation. The method may include maintaining a second plurality of average service times, wherein each of the second plurality of average service times denotes an average service time for servicing I/O operations of a particular I/O type and a particular I/O size externally outside of the data storage system; and determining the estimated service time associated with at least one of the pending I/O operations using a selected one of the second plurality of average service times having an I/O type and an I/O size matching an I/O type and an I/O size of said at least one pending I/O operation. The third time denoting an expected service time estimated for servicing the I/O operation may be determined using a selected one of the first plurality of average service times having an I/O type and an I/O size matching an I/O type and an I/O size of said I/O operation. The step of determining, based on the estimated response time for the I/O operation and the associated service level objective, whether to delay the I/O operation by an additional amount of time thereby increasing a measured response time for the I/O operation by the additional amount may further comprise determining whether the estimated response time for the I/O operation is less than the associated service level objective; and responsive to determining the estimated response time for the I/O operation is less than the associated service level, determining to delay the I/O operation by an additional amount of time equal to a difference between the associated service level and the estimated response time for the I/O operation. The method may include sending a response to the host after servicing the I/O operation, and wherein the data storage system delays sending the response by the additional amount of time. The associated service level of the I/O operation may be included in a service level ranking of a plurality of service levels. A first logical device has a first service level of the service level ranking, and the first service level may be ranked higher than the associated service level of the logical device to which the I/O operation is directed, and the method may include determining the first logical device has a measured response time exceeding a target response time of the first service level; and performing processing to improve performance of the first logical device having the first service level by delaying I/O operations directed to other logical devices, including the logical device, having associated service levels ranked lower than the first service level in the service level ranking.

In accordance with another aspect of techniques herein is a system comprising: at least one processor; and a memory comprising code stored thereon that, when executed, performs a method of processing I/O operations comprising: receiving an I/O operation directed to a logical device having an associated service level objective with a target I/O response time; performing first processing that determines an estimated response time for the I/O operation, the first processing including: determining a first time denoting a fixed baseline amount of time for the I/O operation; determining a second time denoting a cumulative amount of time estimated to service pending I/O operation queued for service prior to the I/O operation; determining a third time denoting an expected service time estimated for servicing the I/O operation; and determining the estimated response time for the I/O operation as a sum of the first time, the second time and the third time; and determining, based on the estimated response time for the I/O operation and the associated service level objective, whether to delay the I/O operation by an additional amount of time thereby increasing a measured response time for the I/O operation by the additional amount.

In accordance with another aspect of techniques herein is a computer readable medium comprising code stored thereon that, when executed, performs a method of processing I/O operations comprising: receiving an I/O operation directed to a logical device having an associated service level objective with a target I/O response time; performing first processing that determines an estimated response time for the I/O operation, the first processing including: determining a first time denoting a fixed baseline amount of time for the I/O operation; determining a second time denoting a cumulative amount of time estimated to service pending I/O operation queued for service prior to the I/O operation; determining a third time denoting an expected service time estimated for servicing the I/O operation; and determining the estimated response time for the I/O operation as a sum of the first time, the second time and the third time; and determining, based on the estimated response time for the I/O operation and the associated service level objective, whether to delay the I/O operation by an additional amount of time thereby increasing a measured response time for the I/O operation by the additional amount. The I/O operation may be received at a data storage system from a host. The first time may include an internal baseline time for servicing the I/O operation within the data storage system, and wherein the first time may include an external baseline time for transmitting the I/O operation and associated I/O operation data between the host and data storage system. The internal baseline time and the external baseline time are determined in accordance with an I/O type and I/O size of the I/O operation.

BRIEF DESCRIPTION OF THE DRAWINGS

Features and advantages of the present invention will become more apparent from the following detailed description of exemplary embodiments thereof taken in conjunction with the accompanying drawings in which:

FIG. 2B is a representation of the logical internal communications between the directors and memory included in one embodiment of data storage system of FIG. 2A;

FIGS. 5, 6, 7 and 8 are tables of time information that may be used in an embodiment in accordance with techniques herein;

FIG. 9 is an example of information that may be associated with each I/O request received on a data storage system in an embodiment in accordance with techniques herein;

DETAILED DESCRIPTION OF EMBODIMENT(S)

Figure 1:
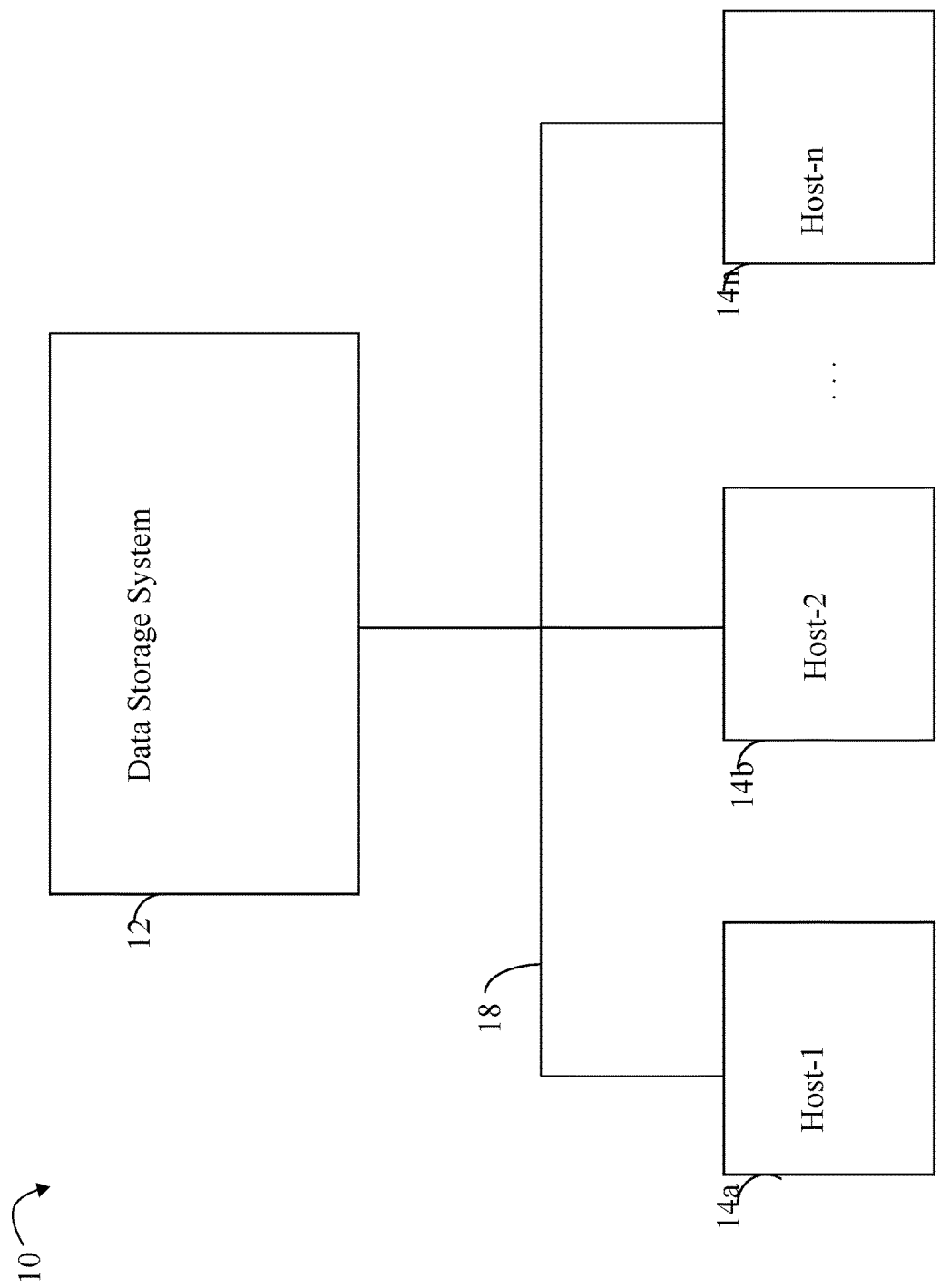
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array, as well one or more other data storage systems or appliances as may vary with the embodiment.

Figure 2A:
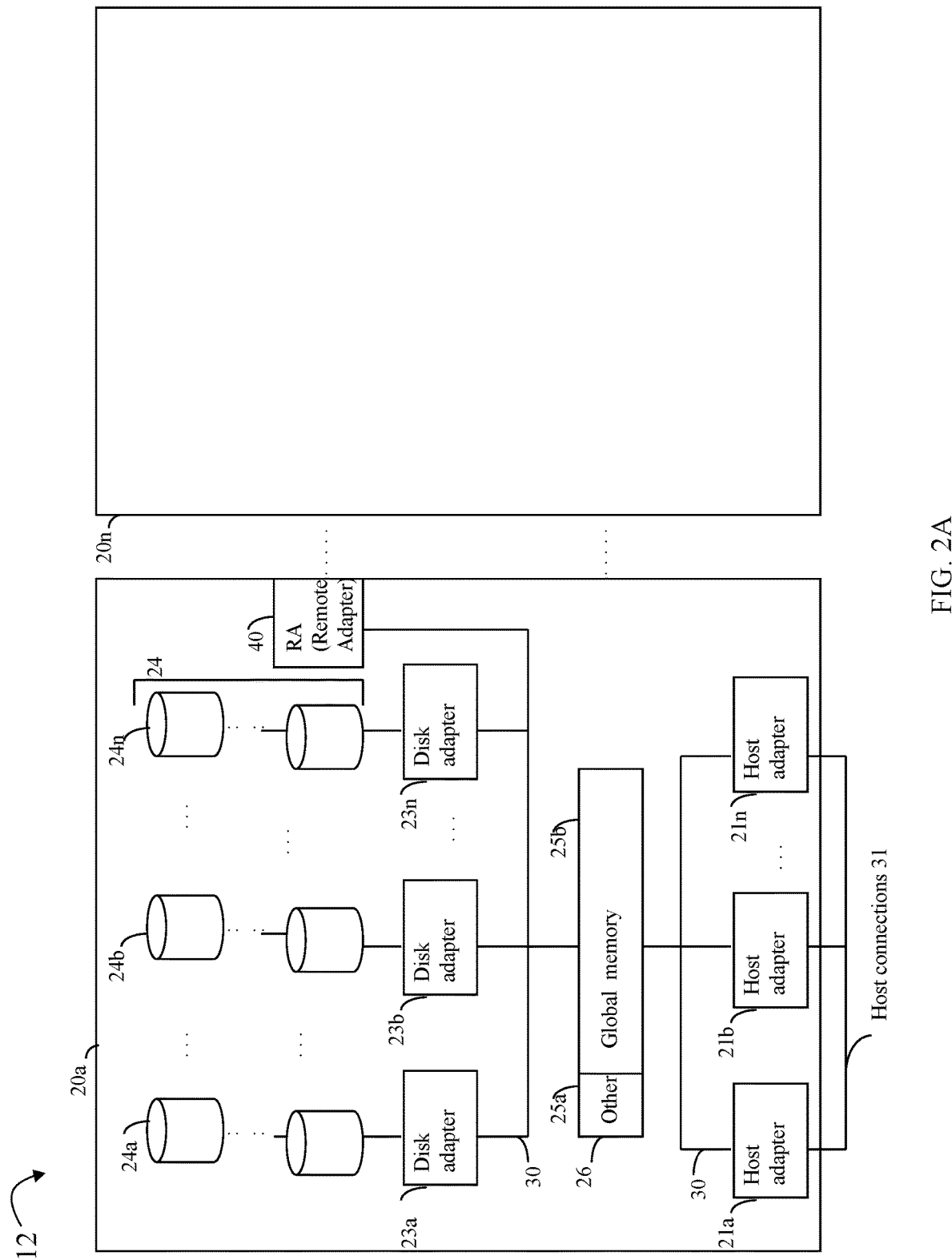
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service or facility may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In connection with performing I/O operations, such as writes as well as reads, a data storage system in an embodiment in accordance with techniques herein may use a cache in order to improve performance.

Figure 3:
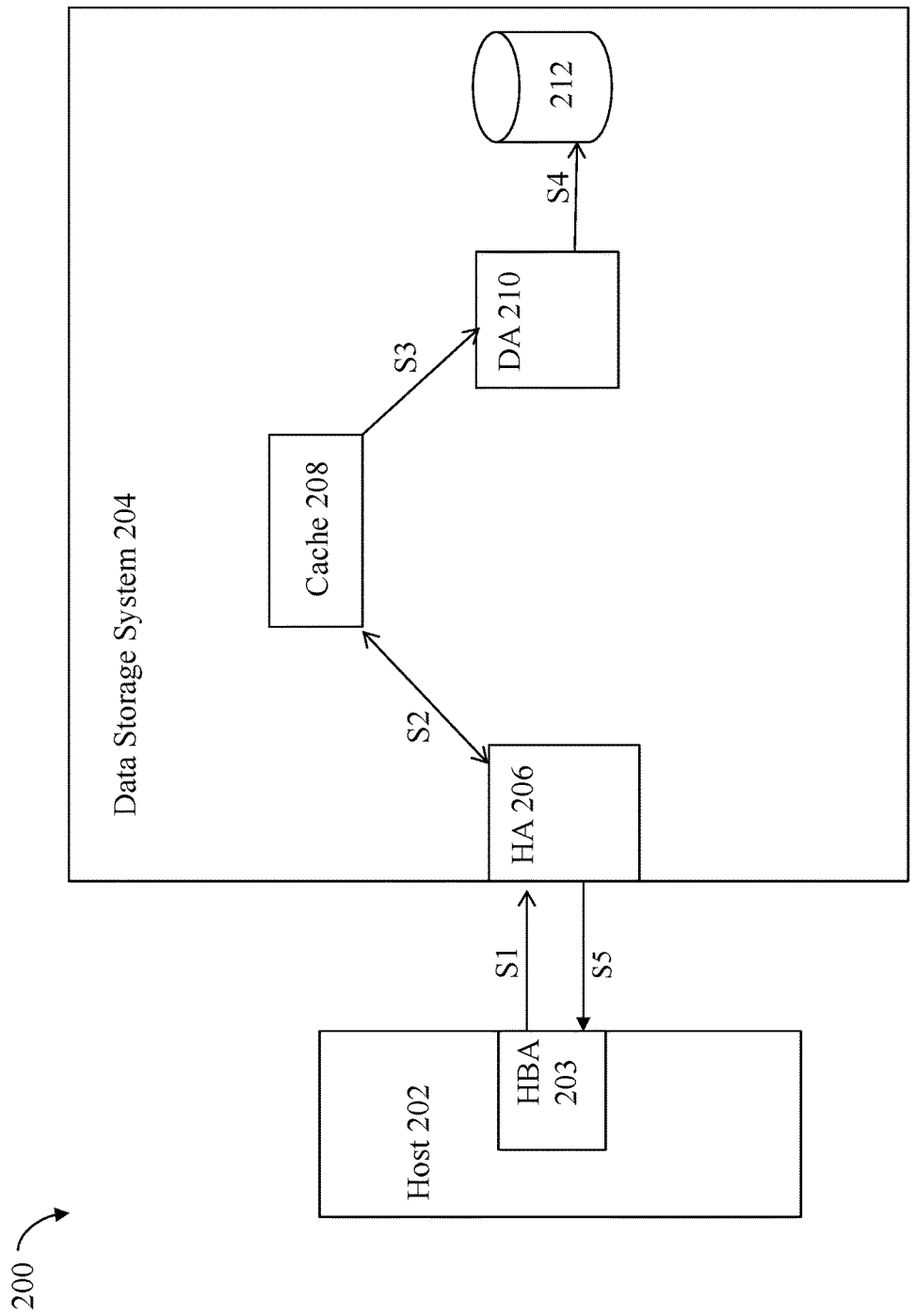
FIG. 3 is an example illustrating processing that may be performed in connection with servicing a write in an embodiment in accordance with techniques herein.

Referring to FIG. 3, shown is an example illustrating processing of a write I/O operation received at the data storage system in an embodiment in accordance with techniques herein, whereby a host, or other client, may issue the write operation. The example 200 includes host 202 and data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes DA 210, cache 208 and physical storage device 212, such as a disk drive. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in the example 200, the cache 208 may be a portion of global memory of the data storage system 204 whereby cache 208 is used as a data cache for data that is read from and/or written to physical storage such as in connection with I/O operations received from the host 202 at the data storage system 204. In following paragraphs as illustrated in FIG. 3 is processing performed for a write operation.

In step S1, the host 202 may issue a write request over a port of its HBA 203 where the write request is received by the HA 206 of the data storage system 204. In a step S2, the HA 206 may store the write operation data in cache 208 and mark the cache slot or cache location as write pending (WP) thereby denoting the cache slot includes write data that needs to be written to physical storage. In some embodiments, the data storage system may return a response to the host indicating that the write operation has been completed successfully following S2 once the write data has been stored in the cache 208. Once the write data has been stored in cache 208 in step S2, processing may be performed at some time later to destage the write data from cache 208 to the physical drive 212. Thus, in a step S3, the DA 210 may obtain the write data from cache 208 and then store the write data in step S4 at the appropriate location on the physical device 212. Although not described herein and as will be appreciated by those skilled in the art, other processing may be performed in connection with processing the write operation such as, for example, setting the cache slot location to no longer indicate WP once the write data is written to physical storage in step S4. In at least one embodiment in accordance with techniques herein, once the write data has been stored in the cache by step S2, an acknowledgement may be sent S5 from the data storage system to the host indicating completion of the write operation. Thus, in at least one embodiment, the acknowledgement in S5 may be sent independent of whether the write data has actually been written out to the physical drive 212.

Figure 4:
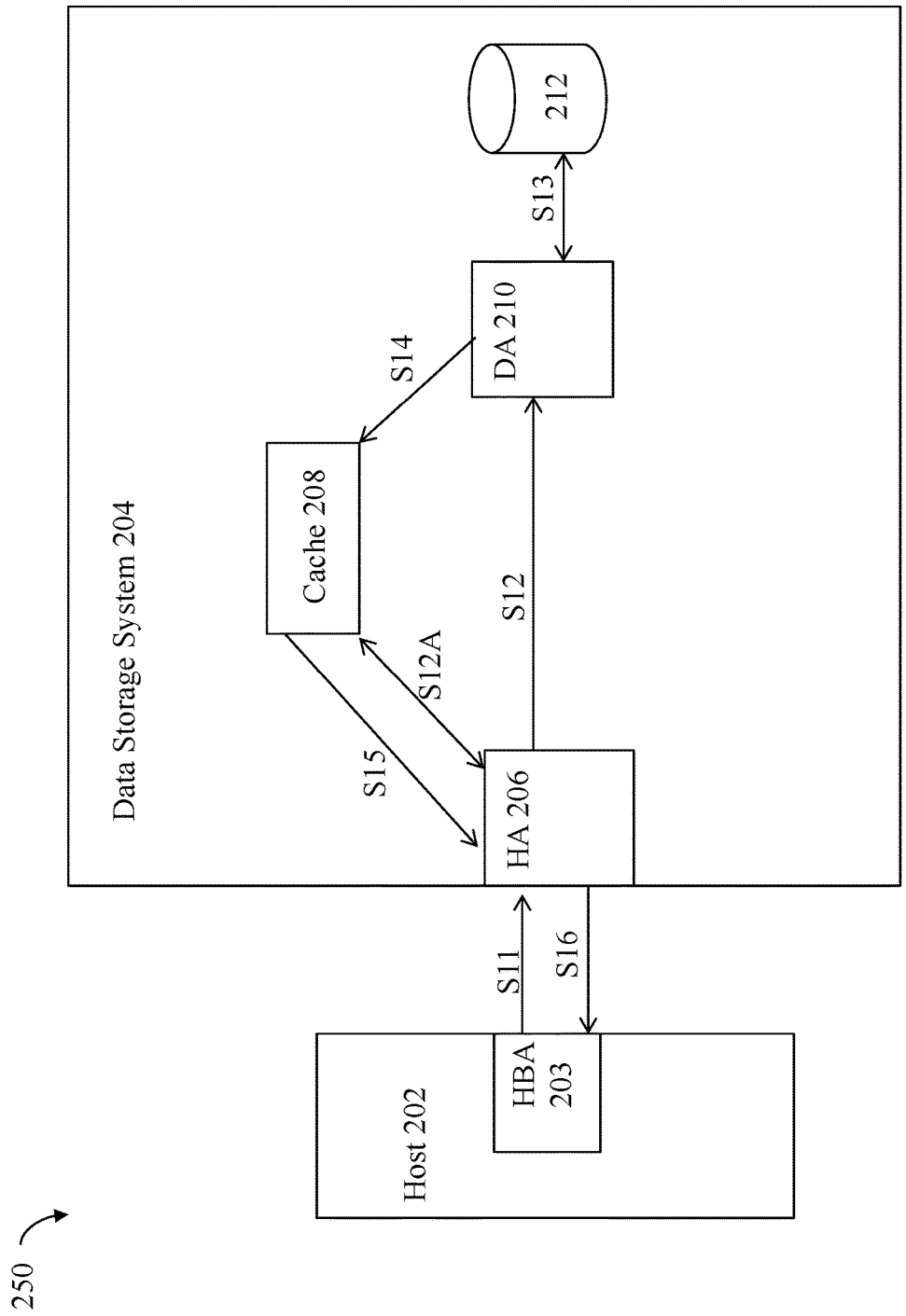
FIG. 4 is an example illustrating processing that may be performed in connection with servicing a read in an embodiment in accordance with techniques herein.

Referring to FIG. 4 shown is an example illustrating processing of a read I/O operation received at the data storage system, in an embodiment in accordance with techniques herein, whereby a host may issue the read operation. The example 250 includes host 202, data storage system 204, and components similarly numbered and as described elsewhere herein.

As a first step S11, the host 202 sends the read request to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in step S12A and returns the requested read data to the host 202 in step S16. Alternatively, if the read request is a read miss, processing may be performed to retrieve the data from physical storage, store the requested read data in cache, and then return the cached read data to the host. In connection with read miss processing, the HA 206 may request S12 that a back-end component, such as the DA 210, retrieve the requested data from physical storage device 212. It should be noted that in performing S12, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in step S13. The DA 210 may store the read data in cache 208 in step S14. The HA 206 may then retrieve the read data in step S15 from the cache 208 and then return the requested read data (as retrieved from cache) to the host 202 in step S16.

Requests to read and/or write data, such as for I/O operations received by an HA from the host, identify a location of where data is read from or written to, where such location is expressed in terms of a LUN and LUN offset (e.g., LBA or logical block address) in the LUN's logical address space. Data for the LUN and LUN offset is stored at a physical storage location on a physical device (PD). Thus, the LUN and LUN offset may be mapped by the data storage system to a physical device (PD) and location on that PD when reading data from and/or writing data to that LUN and LUN offset. For example, a DA may map the LUN and LUN offset to a corresponding PD and location on the PD.

The data storage system may provide a multi-tenant (MT) environment whereby multiple tenants store their data on the data storage system. In such an exemplary MT environment, a different service level objective or SLO may be specified for each tenant that defines a target performance level for the tenant. For example, an SLO may be related to a target level of performance or service with respect to I/O operations serviced at the data storage system. The SLO specified may be expressed in terms of one or more metrics, such as based on response time (RT). For example, the SLO specified for the tenant may include an average response time (RT) with respect to I/Os issued by the tenant. To further illustrate, an SLO may specify an average RT of 3 milliseconds (ms.) for the tenant whereby the tenant has a target or goal of an average I/O RT of 3 ms. for each LUN storing the tenant's data. The tenant may also be referred to as a consumer of the data storage system (and data storage system resources) where the consumer's data is stored on the data storage system. A single tenant or consumer may be, for example, an application executing on a host. A single host may have one or more applications. In at least one embodiment, an SLO may be specified for each logical group of one or more LUNs, such as a storage group (SG) of LUNs used by one or more applications.

Additionally, although examples and illustrations herein may refer to a RT specified as an SLO, it should be noted that an SLO may be specified using one or more other metrics other than RT. For example, I/O related SLOs may be specified in terms of target I/O throughput (e.g., I/O rate such as I/Os per second), data throughput (e.g., megabytes per second), and the like. An SLO, such as the RT SLO described herein, may be applied on a per LUN level (e.g., target I/O RT SLO for each LUN individually).

Generally, the I/O RT of an SLO for a LUN may be characterized as the target or goal I/O RT performance for the LUN. The data storage system may perform processing to control, achieve or regulate I/Os and resources utilized for processing such I/Os in order to maintain the I/O RT of the SLO. An SLO violation may occur when the LUN's observed I/O RT does not meet the I/O RT specified by the SLO. An SLO violation may occur if the measured or observed I/O RT performance is lower than the target SLO performance (e.g., measured I/O RT>target I/O RT of SLO), or if the measured or observed I/O RT performance is higher than the target SLO performance (e.g., measured I/O RT<target I/O RT of SLO). For example, the SLO may specify an average I/O RT of 3 ms. An SLO violation may be determined if the average RT (as determined from observed RT values) deviates from, above or below, the SLO RT of 3 ms. (e.g., within a specified tolerance). Thus, an SLO violation may occur if the measured or observed performance is better than as specified in the SLO (e.g., measured I/O RT is less than SLO I/O RT). Such an SLO violation for a LUN where current I/O RT performance exceeds that of the SLO target may result in overutilization of resources in connection with servicing I/Os directed to the LUN. Responsive to such an SLO violation of exceeding target performance, remediation processing may be performed to attempt to alleviate, and, if possible, eliminate, the SLO violation. Any suitable technique may be used to remove or alleviate the SLO violation of exceeding target performance. For example, remediation processing may be performed to decrease I/O performance when the measured RT is less than the specified SLO RT. For example, if the SG of LUNs has a measured average RT of 3 ms. and an SLO of 5 ms, processing may be performed to decrease performance of I/Os directed to such LUNs of the SG in order to achieve the 5 ms I/O RT target of the SLO for the LUN such as by reducing resources for use by the I/Os directed to the SG LUNs, and/or introducing artificial time delays with respect to I/Os directed to LUNs of the SG. For example, an embodiment may introduce a temporary additional time delay for I/Os directed to the LUNs of the SG exceeding its SLO target performance.

In some existing systems not using techniques herein, the amount of additional time delay injected in order to reduce measured I/O performance for a LUN exceeding its target I/O RT of an SLO may be calculated based on a large amount of historical data that is collected and analyzed. For example, in at least one existing system not using techniques herein, large amounts of data may be continuously collected at specified time intervals where such data is analyzed to identify historic performance patterns in efforts to determine time delays to add and avoid overutilization. Such techniques may use feedback processing where a first additional time delay may be added to I/Os. Subsequently, data may be collected to determine the measured I/O RT achieved with this first time delay in effect in order to determine whether further adjustments to the additional time delay are needed to achieve the specified SLO I/O RT. The foregoing may be repeated. The foregoing techniques used in some existing systems may use an undesirable amount of system resources in connection with data collection and analysis.

In contrast to the foregoing, described in following paragraphs are techniques that avoid excessive historical data collection and analysis to estimate an expected RT for an I/O and determine an additional amount of time delay to be added, on a per I/O basis, if needed.

In at least one embodiment, an SLO may be assigned to each defined logical SG of one or more LUNs, as noted above, where each/every I/O directed to any LUN of the SG has the same SLO (as specified for the SG).

In at least one embodiment described herein for purposes of illustration, SLOs may be specified using the following service levels, from highest service or performance level to lowest service or performance level: DIAMOND (highest), GOLD, and BRONZE (lowest). Each of the foregoing service levels may have an associated SLO such as a specified RT goal. For example, DIAMOND may have a 1 millisecond RT goal (whereby I/Os directed to a LUN with a DIAMOND SLO may be serviced at the highest priority as soon as possible), GOLD may have a 2 millisecond RT goal, and BRONZE may have a 6 millisecond RT goal. It should be noted that other embodiments may have additional and/or different service levels than as noted above and used elsewhere herein for purposes of illustration.

In at least one embodiment in accordance with techniques herein, in order to achieve a desired target SLO for one performance level, such as DIAMOND, measured RT for I/Os directed to a LUN having a DIAMOND service level may be decreased (e.g., to increase performance) by delaying I/Os associated with other lower performance levels of GOLD and BRONZE. For example, for LUN A having DIAMOND performance level, I/Os directed to other LUNs having associated BRONZE or GOLD performance levels may be delayed (by adding an additional time delay per I/O directed to BRONZE or GOLD LUNs) in order to allow I/Os directed to the LUN A with the DIAMOND performance level to proceed and improve performance of measured I/O RT for LUN A/DIAMOND SLO. The additional I/O delay for the BRONZE and GOLD performance levels may be implemented to temporarily increase the RT for I/Os directed to LUNs having the BRONZE and GOLD service levels. In this manner, the DIAMOND I/Os of LUN A may be given a further higher relative priority and additional resources than I/Os directed to other LUNs have associated BRONZE and GOLD performance levels by introducing additional time delays to I/Os directed to the other LUNs (having BRONZE and GOLD performance levels). For example, assume LUN A having DIAMOND SLO currently has a measured I/O RT of 3 ms. whereby LUN A is not meeting its specified I/O RT SLO of 1 ms. In efforts to improve the performance for I/Os directed to DIAMOND SLO LUN A, processing may be performed to inject additional time delays for I/Os directed to LUNs having lower service levels of BRONZE and GOLD. A LUN B with a BRONZE performance level may have an SLO of 6 milliseconds for the average I/O RT. I/Os directed to LUN B with the 6 millisecond RT goal may be delayed by an additional amount of time in addition to the actual amount of time taken service the I/Os. For example, after servicing an I/O directed to LUN B, sending an acknowledgement to the host may be delayed by an artificial time delay amount. However, one problem is how much additional (artificial) delay should be added, if any, to an I/O directed to LUN B. Additionally, another problem is determining whether some additional time delay is be added to all I/Os directed to BRONZE LUN B, or only selected I/Os.

As noted above, some existing systems may collect and analyze historical data and information on system load in making such a decisions. Thus such existing systems may utilize an excessive, undesirable amount of resources to perform the foregoing.

Techniques herein in one aspect may be characterized as a new methodology which may not require such extensive use of resources for collection and analysis of historical data. Techniques herein may estimate the additional I/O time delay, if any, to be injected for an I/O based on the current system state in an efficient manner. For example, assume as discussed above where LUN A with a DIAMOND SLO currently has a measured I/O RT of 3 ms. whereby LUN A is not meeting is specified I/O RT SLO of 1 ms. In efforts to improve the performance for I/Os directed to DIAMOND SLO LUN A, processing may be performed using new efficient techniques described herein to inject additional time delays for I/Os directed to LUNs having lower service levels of BRONZE and GOLD. A LUN B with a BRONZE performance level may have an SLO of 6 milliseconds for the average I/O RT. Processing may be performed using techniques herein to determine whether to inject an additional time delay for selected I/Os directed to LUN B with the 6 millisecond RT goal. The additional time delay may be an amount of time in addition to an estimated RT for servicing the I/Os. In at least one embodiment in accordance with techniques herein for a new I/O directed to BRONZE LUN B received on the data storage system, processing may be performed to estimate the expected RT of the I/O based on a current state of the data storage system. Subsequently, an additional time delay may be added, if needed, based on the BRONZE SLO associated with the new I/O. For example, an additional time delay for an I/O directed to BRONZE LUN B may be added if the I/O's estimated expected RT is less than the BRONZE SLO of 6 ms. The estimate regarding the expected RT for the new I/O may be determined using baseline (e.g., fixed or constant) time delays of internal and external cost tables as well as additional amount of time incurred that may vary, per I/O, over time. The latter variable amount of time may be determined in accordance with the current load and state of the data storage system, such as current pending I/Os queued for execution or service prior to the new I/O as well as a current estimated amount of time to service the I/O (excluding wait or queuing time) once selected for servicing from the queue of pending I/Os.

In the new methodology in at least one embodiment in accordance with techniques herein, an internal cost table of baseline (e.g., fixed or constant) time delays may be used. The internal cost table may denote the baseline amount of time needed to process I/Os of a particular type (e.g., read heat, read miss, or write) and of a particular I/O size (e.g., 4K bytes) within the data storage system (e.g., internal with respect to the data storage system). There may be different internal costs specified for read hit and read miss I/Os of different sizes and there may be different internal costs specified for write I/Os of different sizes due to the amount of processing performed internally by components of the data storage system. An internal cost for a particular type of I/O operation of a particular I/O size may denote a base cost in terms of constant time incurred for processing the I/O by and within the data storage system independent of system load. In other words, the base cost or baseline time delay as reflected by the internal cost does not include additional time delays that may be experienced due to system load, for example, additional time waiting in queues due to high workload on different system components and resources.

Generally, an embodiment may determine the internal baseline cost or time for processing a particular type of I/O of a particular size by measuring the amount of time it takes the data storage system to service the I/O once received at the data storage system when there is minimal or no load on the system. The internal baseline time may denote the amount of time measured from when the I/O is received by the data storage system (e.g., by an FA or HA generally) and end with the point in time when the system is ready to send an acknowledgement (along with any requested read data) to the client (e.g., host) that the I/O operation has completed. The internal baseline time for a particular type of I/O (e.g., read hit, read miss or write) and I/O size may include accessing any data from physical storage and/or cache as needed to service the I/O operation (e.g., for reads) or storing any data (e.g., storing write data to cache). The internal baseline times for a particular data storage system may be determined by empirically measuring the foregoing amount of time for each of the desired I/O types and I/O sizes while the system has no load, such as off hours when the system is offline or not servicing client I/Os. For example, the internal cost or baseline time for Read miss of size 4K bytes may be 8 microseconds and the internal cost for read miss of size 8K may be 12 microseconds. In a similar manner, internals costs may be specified for read hits and write I/Os of different sizes. It should be noted that for write operations, consistent with discussion elsewhere herein such as in connection with FIG. 3, once the write data is written to cache, an acknowledgement regarding completion of the write may be returned to the host or other client. Thus, the internal baseline time for writes is based on when the foregoing acknowledgement is ready to be returned to the host after writing the write data to cache (e.g., does not include time to destage write data from cache to non-volatile backend physical storage 212).

Figure 5:
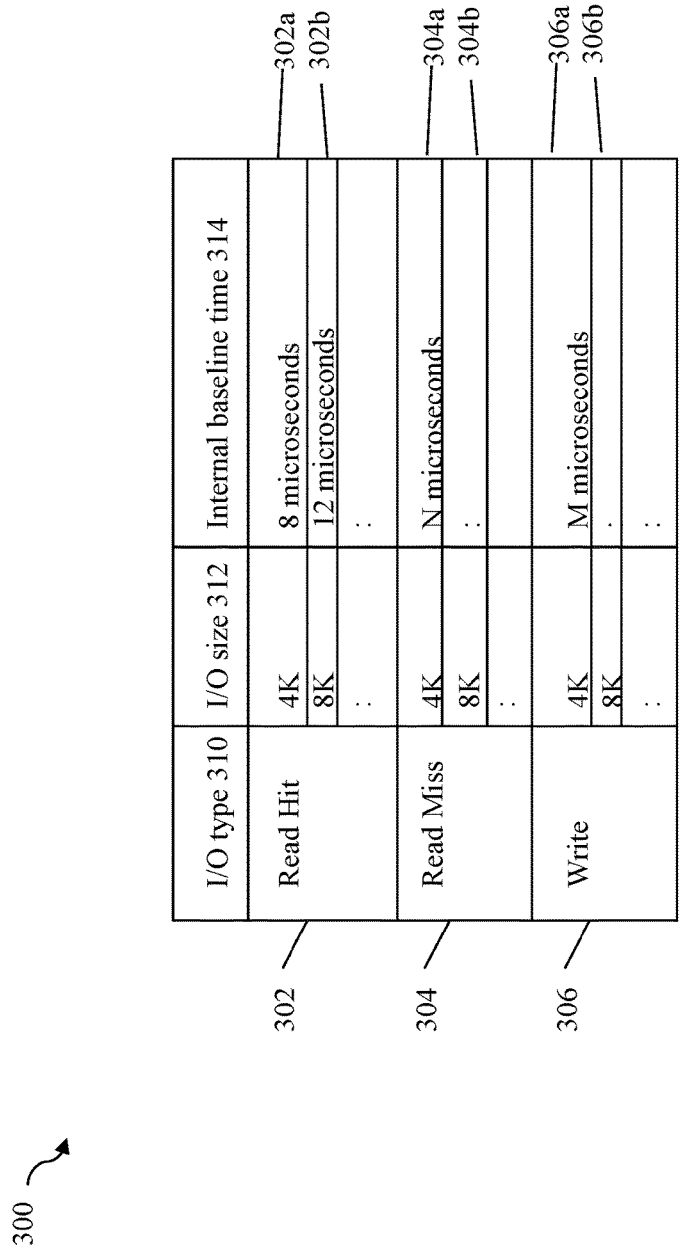

Referring to FIG. 5, shown is an example 300 of an internal cost table of baseline times that may be used in an embodiment in accordance with techniques herein. The table 300 includes the following 3 columns: I/O type 310, I/O size 312 and internal baseline time 314. Element 302 denotes the rows of the table 300 including internal baseline times for different read hit I/O sizes. For example row 302a indicates that the internal baseline time for a read hit I/O size of 4K is 8 micro seconds and row 302b indicates that the internal baseline time for a read hit I/O size of 8K is 12 microseconds. Element 304 denotes the rows of the table 300 including internal baseline times for different read miss I/O sizes. For example row 304a indicates that the internal baseline time for a read miss I/O size of 4K is N micro seconds. Element 306 denotes the rows of the table 300 including internal baseline times for different write I/O sizes. For example row 306a indicates that the internal baseline time for a write I/O size of 4K is M micro seconds. Generally, the table 300 may include rows of information for different I/O sizes supported in an embodiment for read and write commands.

With respect to write I/O operations and with reference back to FIG. 3, the internal baseline time for a write operation of a particular I/O size may be the amount of time measured with the system having no load from when the write command is received by HA 206 to when the HA 206 is ready to return an acknowledgement to the host 202 (e.g., includes time for storing write data in cache 208 as in S2).

With respect to read miss I/O operations and with reference back to FIG. 4, the internal baseline time for a read miss operation of a particular I/O size may be the amount of time measured with the system having no load from when the read miss command is received by HA 206 to when the HA 206 is ready to return an acknowledgement and requested read data to the host 202 (e.g., includes time for S12, S13, S14 and S15 for obtaining the requested read data from the physical device 212, storing the read data in cache, and having the HA 206 obtain the read data from cache to return to the host 202 in S16).

With respect to read hit I/O operations and with reference back to FIG. 4, the internal baseline time for a read hit operation of a particular I/O size may be the amount of time measured with the system having no load from when the read hit command is received by HA 206 to when the HA 206 is ready to return an acknowledgement and requested read data to the host 202 (e.g., includes time for S12A for the HA 206 obtaining the requested read data from cache prior to returning the read data to the host 202 in S16).

Additionally, an embodiment may also utilize an external cost table for each I/O type and I/O size. The external cost may denote the baseline (e.g., fixed or constant) amount of time of an external delay on a SAN for transferring the I/O operation and its payload between the host or other client and the data storage system, such as through the SAN. The external baseline times (e.g., SAN delays) may be measured, for example, by the data storage system and include the time to transfer the I/O operation and payload through the SAN (e.g., from the host to the data storage system and data storage system to the host). The external delays costs table may include different baseline time delays or costs for I/Os of various size, such as 4K bytes, 8K bytes 16K bytes, . . . , 256K bytes. The external costs may denote the external baseline amount of time for processing an I/O operation of a particular type and size external with respect to the data storage system. In a manner similar to the internal baseline times of the internal cost table, the external baseline times of the external cost table are independent of SAN or network load (e.g., independent of load on communication connection between host and data storage system over which the I/O and payload are transferred). The external baseline times for a particular SAN (or more generally connection or network between the host and data storage system) may be determined by empirically measuring the foregoing amount of time for each of the desired I/O types and I/O sizes while there is no load on the SAN (e.g., no load on connection or network, such as the link(s) or switch(es) connecting the host and data storage system, where the I/O is sent over such connection or network) such as off hours when the SAN and data storage system are not servicing client I/Os. For example, for a write command of size 4K bytes, the external baseline time includes the amount of time to send the write I/O command and 4K bytes of write data from the host to the data storage system and also (once the write command has been serviced by the data storage system) the amount of time to return an acknowledgement from the data storage system to the host regarding completion of the write command. For example, for a read command of size 4K bytes, the external baseline time includes the amount of time to send the read I/O command from the host to the data storage system and also (once the read command has been serviced by the data storage system) the amount of time to return the read data and an acknowledgement from the data storage system to the host regarding completion of the read command. In at least one embodiment, the external baseline times of the external cost table for different I/O sizes and commands may be determined each time the data storage system boots up for the particular current SAN configuration.

Figure 6:
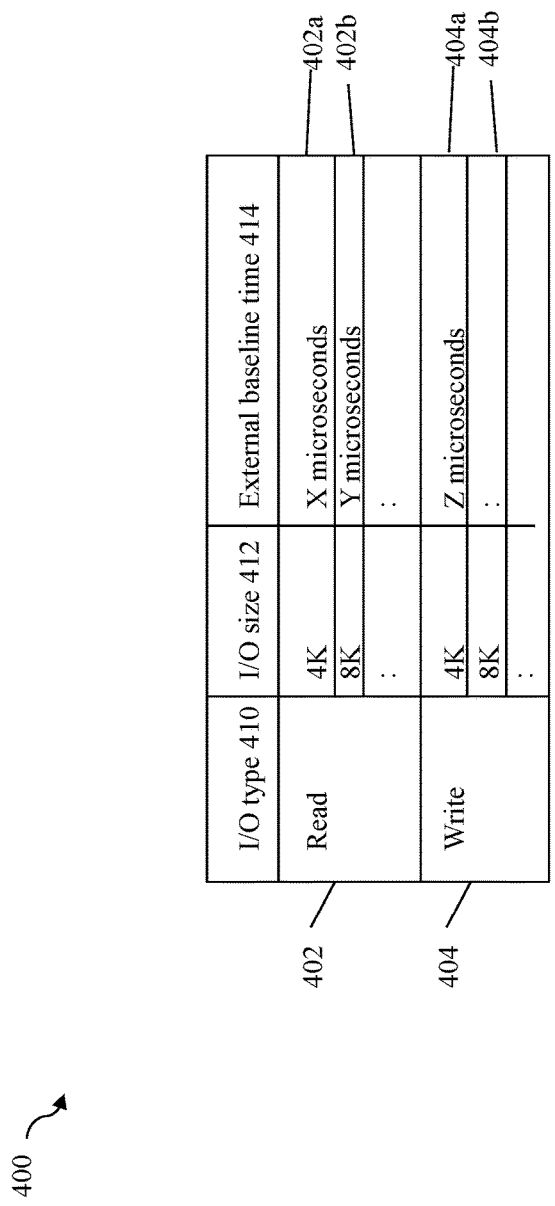

Referring to FIG. 6, shown is an example 400 of an external cost table of baseline times that may be used in an embodiment in accordance with techniques herein. The table 400 includes the following 3 columns: I/O type 410, I/O size 412 and external baseline time 414. Element 402 denotes the rows of the table 400 including external baseline times for different read I/O sizes. For example row 402a indicates that the external baseline time for a read I/O size of 4K is X micro seconds and row 402b indicates that the external baseline time for a read I/O size of 8K is Y microseconds. Element 404 denotes the rows of the table 400 including external baseline times for different write I/O sizes. For example row 404a indicates that the external baseline time for a write I/O size of 4K is Z micro seconds. Generally, the table 400 may include rows of information for different I/O sizes supported in an embodiment for read and write operations.

With respect to write I/O operations and with reference back to FIG. 3, the external baseline time for a write operation of a particular I/O size may be the total amount of time measured with the SAN, or more generally connection between the host 202 and data storage system 204, having no load. The total amount of time may include a first amount measured from when the write command and write data are sent by HA 206 (in performed S1) to when the write command and write data are received by the data storage system. The total amount of the external baseline time for the write operation may also include a second amount of time measured from when the system 204 issues the write command acknowledgement to when the HA 206 receives the foregoing acknowledgement.

With respect to read I/O operations and with reference back to FIG. 4, the external baseline time for a read operation of a particular I/O size may be the total amount of time measured with the SAN, or more generally connection between the host 202 and data storage system 204, having no load. The total amount of time may include a first amount measured from when the read command is sent by HA 206 (in performed S11) to when the read command is received by the data storage system. The total amount of time for the external baseline time for the read operation may include a second amount of time measured from when the system 204 returns the read data to when the HA 206 receives the requested read data.

The foregoing internal and externals cost tables may define the constant, baseline or fixed time delays experienced for I/Os. Put another way, the cost tables of FIGS. 5 and 6 may denote the minimum time delays or costs that can be expected for the particular I/O types and I/O sizes. Such costs may be determined, for example, by running the data storage system, host and SAN in a testing mode or stand-alone mode without servicing any actual client/host requests where the different I/O commands of various sizes are issued to measure the internal and external baseline times used to populate the tables of FIGS. 5 and 6.

In estimating the RT for a new I/O in connection with techniques herein, processing may consider the baseline or fixed costs (e.g., internal and external baseline times) as described above and also consider additional variable time delays that may change over time depending on current system load. For example, as described below in more detail, estimating the RT for a new I/O may also include determining how long the I/O is expected to wait (e.g., such as in a pending I/O queue) before the I/O is serviced or executed, as well as the amount of time expected to service or execute the I/O command once the I/O command reaches the front of the queue (e.g., once the I/O command is selected from the queue for processing at a current point in time).

To further illustrate use of techniques herein, assume as discussed above that LUN A with a DIAMOND SLO RT=1 ms. currently has a measured I/O RT of 3 ms. whereby LUN A is not meeting is specified I/O RT SLO of 1 ms. In efforts to improve the performance for I/Os directed to DIAMOND SLO LUN A, processing may be performed in accordance with technique herein to inject additional time delays for I/Os directed to LUNs having lower service levels of BRONZE and GOLD. A LUN B with a BRONZE performance level may have an SLO of 6 milliseconds for the average I/O RT. Assume that a new I/O directed to LUN B is received where LUN B has a BRONZE level SLO=6 ms. For the new I/O, processing may be performed to first predict or estimate the RT for the new I/O based on the current state of the system. In at least one embodiment in accordance with techniques herein, an additional time delay may be injected if the estimated or predicted RT for the new I/O is less than the 6 ms. SLO RT target for LUN B. The amount of additional time delay may be, for example, the difference between the 6 ms. target I/O RT of the SLO and the estimated or predicted RT for the new I/O. The foregoing processing performed for the new I/O directed to LUN B is described in more detail in following paragraphs.

As a first step 1, processing may use the internal cost table to determine the internal baseline time for the new I/O. With reference back to FIG. 5, the I/O type and I/O size of the new I/O are used to select a corresponding internal baseline time from column 314. For example, assume the new I/O is a read hit with an I/O size of 4K. In this case, processing selects row 302a from the table 300 of FIG. 5 and determines the internal baseline time of 8 microseconds as the internal constant time delay (e.g., time delay based on internal processing performed within the data storage system) for the new I/O.

As a second step 2, processing may use the external cost table to determine the external baseline time for the new I/O. With reference back to FIG. 6, the I/O type and I/O size of the new I/O are used to select a corresponding internal baseline time from column 414. For example, assume the new I/O is a read hit with an I/O size of 4K. In this case, processing selects row 402a from the table 400 of FIG. 6 and determines the external baseline time of X microseconds as the external constant time delay (e.g., total time delay incurred for sending the new I/O request over the SAN (e.g., network, link or connection) from the host to the data storage system and the return trip time for sending the requested read data payload of the new I/O from the data storage system to the host over the SAN).

As a third step 3, processing is performed to examine the current state of the system to estimate the amount of time the new I/O will wait in the I/O pending queue prior to being serviced. In step 3, the data storage system inspects the currently queued I/Os (with their assigned SLOs) currently waiting to be serviced and evaluates the estimated time delay this new I/O will experience due to other pending I/Os in the queue that will be serviced prior to servicing the new I/O (e.g., since the data storage system knows all the queued/other pending I/Os that will be serviced before this new I/O).

In connection with step 3, processing is performed to estimate the amount of time the new I/O will have to wait in the queue before servicing or execution of the new I/O is performed. Generally, an embodiment may use any suitable prioritization or ordering of pending I/Os waiting to be serviced. An example that may be used in an embodiment is described elsewhere herein. However, generally, when the new I/O is received by an HA or FA of the data storage system, it is determined whether the new I/O may be serviced at the current time. If the new I/O can be serviced immediately, there is no wait time in a front end (e.g., per FA/HA) queue and no other pending I/Os in the queue to be serviced prior to the new I/O. Alternatively, the new I/O may not be serviced immediately since the system may be currently servicing another I/O previously received at the HA or FA. As a result, the new I/O may be placed in a queue of pending I/Os received by the HA or FA where such queued I/Os are awaiting servicing by the data storage system. The queue may generally be a prioritized sorted list of pending I/Os and the new I/O may be placed in the queue at a position with respect to its priority relative to priorities of other pending I/Os currently in the queue. For example, assume the new I/O is placed in the queue and will be processed after 4 other pending I/Os in the queue. The amount of time the new I/O will have to wait in the front-end queue (e.g., of the HA or FA) before servicing is based on the sum of the estimated or expected amount of time to service the other 4 pending I/Os.

In at least one embodiment in accordance with techniques herein, information regarding the service times for the current state of the system may be maintained. In at least one embodiment, the system may maintain a moving average (e.g., most recent 4 I/Os) of the time it has taken internal data storage system components to service prior I/Os of the same I/O type of the same size once such I/Os are selected from a front end pending I/O queue of an FA or HA for servicing. For example, for a read miss of a particular size, how long did it take the DA (e.g., disk controller) to obtain the requested read data and store the read data in memory or cache, and then for the FA to retrieve the read miss data from cache to be returned to the host? For a read hit of a particular size, how long did it take the HA or FA (e.g., front end component) to obtain the requested read data from cache? For a write of a particular size, how long did it take the HA or FA (e.g., front end component) to store the write data into cache? Thus, the moving averages take into account the current state of the system in a rather simplistic calculation performed regarding the amount of time to service similar recent I/Os. The moving averages may denote the expected estimate of time to service the new I/O once it is selected for processing (e.g., servicing or execution) from the queue. The foregoing moving averages (denoting the average service times for servicing I/Os once selected for processing from the pending front end I/O queue) that may be maintained and used in an embodiment in accordance with techniques herein are described in connection with FIG. 7 below.

Referring to FIG. 7, shown is a table 500 of average service times that may be maintained for use in an embodiment in accordance with techniques herein. The table 500 includes 3 columns: I/O type 510, I/O size 512 and average service time 514. Element 502 denotes the rows of the table 500 including average service times for different read hit I/O sizes. For example row 502a indicates that the average service time for a read miss I/O size of 4K is T1 micro seconds and row 502b indicates that the average service time for a read miss I/O size of 8K is T2 microseconds. Element 504 denotes the rows of the table 500 including average service times for different read miss I/O sizes. For example row 504a indicates that the average service time for a read miss size of 4K is T11 micro seconds; and row 504b indicates that the average service time for a read miss I/O size of 8K is T12 microseconds. Element 506 denotes the rows of the table 500 including average service times for different write I/O sizes. For example row 506a indicates that the average service time for a write size of 4K is T21 micro seconds; and row 506b indicates that the average service time for a write I/O size of 8K is T22 microseconds.

Generally, the table 400 may include rows of information for different I/O sizes supported in an embodiment for read and write operations. The information in table 500 may be characterized as providing a snapshot or information regarding the current state of the data storage system at a point in time based on the average service times of 514. In at least one embodiment, the average service times of 514 may be moving averages. As known in the art, a moving average may be a simple moving average (SMA) calculated by taking a mathematical average or mean of a set of values. In connection with techniques herein, an embodiment may determine the average service times 514 as SMAs with respect to the most recent number of NN service times for each of the different I/O types and I/O sizes. For example, in at least one embodiment, NN=4 whereby the average service times 514 for each row of the table 500 may be determined by determining the arithmetic mean or average of the most recent 4 service times for I/Os of that particular I/O type and I/O size. In this case, to further illustrate, the average service time of row 302a for read hits of size 4K may be determined as the arithmetic mean or average of the most recent 4 service times for read hit I/Os of size 4K. NN is selected as 4 in the foregoing example for illustration purposes. More generally, any suitable number of I/O service times may be used to determine the average service times 514 for the different combinations of I/O types and I/O sizes. For example, as an alternative, an embodiment may define a window of time, W1, where the average service time (for a particular I/O type and I/O size) may be determined as the average of I/Os occurring in the time period T-W1, where T1 denotes the current point in time when the averages of 514 may be periodically calculated.

Thus, the moving averages for the average service times 514 may be continually adjusted or recalculated as new service times for subsequent I/Os of different I/O types and sizes are obtained. In this manner, the average service times 514 may be continually updated in an efficient manner to reflect the changing current state of the data storage system. As the system load increases, one of more of the average service times 514 may increase thereby reflecting the change in the system state. For example, if an I/O burst of reads are received, it may be expected that the average service time for read misses and/or hits increases.

In at least one embodiment, each pending I/O on a front end pending I/O queue of an HA or FA may be tagged with an estimated or expected service time denoting the amount of time expected to service the pending I/O. The estimated or expected service time of a pending I/O may be the average service time obtained from the table 500 for the particular I/O type and I/O size of the pending I/O. Continuing with the example of the new I/O from above which is a read hit of size 4K directed to LUN B having a BRONZE SLO I/O RT=6 ms., prior to placing the new I/O on the pending I/O queue, the new I/O may be tagged with an expected or estimated service time by selecting row 502a from table 500 having an I/O type 510 and I/O size matching those of the new I/O. In this case, the new I/O may be tagged with an expected or estimated service time of T1 microseconds (e.g., in column 514 of row 502a) based on the current state of the system. Additionally, each of the other 4 pending I/Os on the queue to be executed prior to the new I/O may also have been previously tagged with an estimated or expected service time in a similar manner Thus, in at least one embodiment which tags pending I/Os of the pending I/O queue with estimated or expected service times, step 3 may include summing such service times of the 4 pending I/Os in order to determine the amount of time the new I/O will have to wait in the pending I/O queue prior to be serviced.

In at least one embodiment, the system may also maintain a moving average (e.g., most recent 4 I/Os) of the time it takes other components having an external relationship with respect to the data storage system to service prior I/Os of the same I/O type of the same size. The foregoing may be characterized as an external relationship time factor that may be an optional component and not be relevant for all I/Os. For example, the external relationship time factor is relevant for I/Os incurring additional time for processing external or outside of the local data storage system including the LUN B to which the new I/O is directed. For example, some I/Os may require an additional cost or time delay to store write data on another external data storage system. For example, writes directed to LUN B on the local data storage system may be mirrored remotely on another LUN B" on another remote data storage system such as part of automatic remote replication configured for the LUN B (e.g., LUN B" may be configured as the remote mirror on the remote data storage system of LUN B of the local data storage system). In such a case, the write may be received by the local data storage system from the host whereby the local system stores the write data in its cache to be destaged to non-volatile physical storage at a later point in time. Additionally, processing is performed to send the write data to the remote data storage system to be written to LUN B". Once the remote data storage system has received the write data and stored the write data in the remote system's cache, the remote data storage system may return an acknowledgement to the local system indicating that the remote system has received the data and completed the write operation. In at least one embodiment, the remote replication may be configured as synchronous or asynchronous replication. For asynchronous replication, the local data storage system (also referred to sometimes as local system) returns an acknowledgement to the host once the local system has stored the write data in the local system cache independent of whether the acknowledgement has been received from the remote data storage system (also referred to sometimes as remote system). For synchronous replication, an acknowledgement regarding completion of the write is not returned to the host until the local data storage system receives the acknowledgement from the remote system regarding completion of the write on the remote system. If LUN B is configured for synchronous replication, an additional amount of time may be added by this external relationship time factor to account for the time to send the write data from the (local) data storage system to the remote system and also for the (local) data storage system to receive an acknowledgement of completion of the write by the remote system (e.g., write completed on remote system once write data is written to remote system cache). The moving averages maintained for the external relationship time factor that may be relevant for an I/O may denote the expected estimate of time to perform external processing (e.g., external with respect to the data storage system receiving the new I/O) for servicing the new I/O once it is selected for processing (e.g., servicing or execution) from the queue. The foregoing moving averages denoting the external relationship time factor that may be maintained and used are described in connection with FIG. 8 below.

Figure 8:
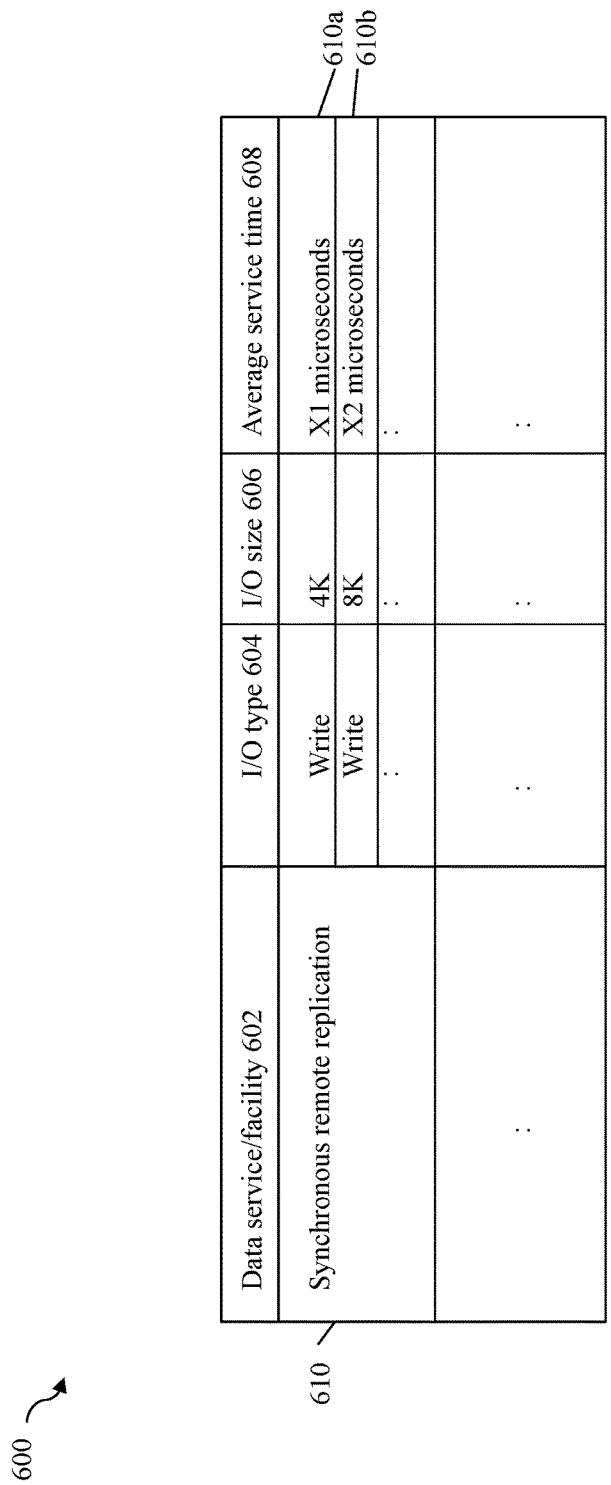

Referring to FIG. 8, shown is a table 600 of average service times regarding the external relationship time factor (e.g., external processing performed externally with respect to the data storage system) that may be maintained for use in an embodiment in accordance with techniques herein. The table 600 includes 4 columns: data service or facility 602, I/O type 604, I/O size 606 and average service time 608. Element 610 denotes the rows of the table 600 including average service times for external processing performed in connection with servicing write I/Os of different sizes when the write I/O is directed to a LUN on the data storage system configured for synchronous remote mirroring or replication on a remote data storage system. For example row 610a indicates that the average service time for external processing performed for a 4K write directed to a LUN configured for synchronous remote replication on a remote system is X1 micro seconds; and row 610b indicates that the average service time for external processing performed for an 8K write directed to a LUN configured for synchronous remote replication on a remote system is X2 micro seconds. In a similar manner, the table 600 may include other rows in 610 for different supported write I/O sizes.

Thus, if the new I/O is 4K write directed to LUN B also configured for synchronous remote replication, the service time the new I/O may be based on an average service time for internal processing selected from table 500 of FIG. 7 (e.g., T1 microseconds of row 302a for 4K write I/Os) and also based on an average service time for external processing selected from table 600 of FIG. 8 (e.g., X1 microseconds of row 610a for 4K write I/Os).

Generally, the table 600 may include rows of information for regarding external processing time required to service I/Os in connection with different data service or facilities. The information in table 600 may be characterized as providing a snapshot or information regarding the current state at a point in time based on the average service times of 608. In at least one embodiment, the average service times of 608 may be moving averages, such as SMAs calculated in a manner similar that as described in connection with the averages 514 of FIG. 7.

The amount of time to complete execution or service a pending I/O may be based on the average service time performed internally within the data storage system (e.g., as in FIG. 7) and, if applicable, may also include an additional average service time for external processing performed regarding the external relationship time factor (e.g., as in FIG. 8). Thus, each pending I/O of the I/O queue may have an associated estimate service time based on the average service time performed internally within the data storage system (e.g., as in FIG. 7) and, if applicable, may also include an additional average service time for external processing performed regarding the external relationship time factor (e.g., as in FIG. 8).

Consistent with discussion above, processing is performed in the third step 3 to estimate the amount of time the new I/O will wait in the I/O queue based on the other pending I/Os queued for servicing prior to the new I/O. In at least one embodiment as also noted above, each pending I/O may be tagged with an associated estimated execution or service time based on the average service time performed internally within the data storage system (e.g., as in FIG. 7) and, if applicable, may also include an additional average service time for external processing performed regarding the external relationship time factor (e.g., as in FIG. 8). As a first variation, an embodiment may choose not to tag each pending I/O with an estimated service time when the I/O is placed in the pending I/O queue. Rather, an embodiment may alternatively choose to estimate the service time of each pending I/O in connection with step 3 using the current information in the tables of FIGS. 7 and 8 when performing processing of step 3 in connection with the new I/O. As yet a further second variation for determining estimated service times of each pending I/O of the front end pending I/O queue of an HA or FA, each pending I/O may be tagged with an estimated service time when the I/O is first placed into the pending I/O queue as described above. Subsequently, the FA or HA may periodically perform processing to recalculate or update the estimated service times of pending I/Os (e.g., along with recalculating estimated I/O response times and time delays for the pending I/Os as discussed elsewhere herein). For example, when the utilization of the FA or HA is below a specified threshold (e.g., not busy such as when utilization is below 50% or some other suitable utilization rate), the FA or HA may perform processing to update estimated service times of pending I/Os using current service times of tables in FIGS. 7 and 8. In this way, the estimated service times of pending I/Os may be further updated as load of the system may change balanced with available system resources so as not to adversely impact system I/O processing during times of heavy usage/load.

In a fourth step 4, processing may be performed to determine an estimated or expected service time (also sometimes referred to as execution time) for the new I/O once the new I/O is selected/removed from the pending I/O queue for servicing. In a manner similar to that as described for pending I/Os, an embodiment may use the information in tables of FIGS. 7 and 8 to estimate the expected service time for the new I/O based on the average service time performed internally within the data storage system (e.g., as in FIG. 7) and, if applicable, may also include an additional average service time for external processing performed regarding the external relationship time factor (e.g., as in FIG. 8).

In a fifth step 5, the different amounts of time from prior steps 1-4 may be summed to provide an estimate or prediction regarding the expected RT for the new I/O. Consistent with discussion herein, the estimated new I/O RT as determined in step 5 may be expressed as in the following EQUATION 1:

$$\text{Estimated new I/O RT} = \text{Internal baseline time} + \text{external baseline time} + \text{time to service pending I/Os queued for service prior to the new I/O} + \text{expected service time for new I/O} \quad \text{EQUATION 1}$$

where:

internal baseline time is the time delay for new I/O is determined in step 1 using table 300 of FIG. 5;

external baseline time is the time delay for new I/O is determined in step 2 using table 400 of FIG. 6;

time to service pending I/Os queued for service prior to the new I/O is determined in step 3; and expected service time for new I/O is determined in step 4. At this point after completing step 5, the data storage system has an estimate regarding the RT for the new I/O on the data storage system. The data storage system may now calculate the difference between the SLO RT target associated with the new I/O and the expected RT for the new I/O to determine the artificial time delay, if any, to be added to this new I/O's RT to meet the SLO RT target. For example, as noted above, assume the new I/O is directed to a LUN with BRONZE SLO of 6 milliseconds. Also assume further that the system calculates that, if the new I/O is queued for execution right now, without any additional artificial time delays, the new I/O has an expected 4 millisecond RT. In this case, the system may add an additional time delay of 2 milliseconds to the new I/O's estimated 4 millisecond I/O RT to meet the 6 millisecond target SLO RT.

In at least one embodiment, processing may be performed periodically to recalculate delays associated with pending I/Os, such as those in the non-urgent queue described elsewhere herein. For example, as noted above, the FA or HA may periodically perform processing to recalculate or update the estimated service times of pending I/Os (e.g., estimated service time as determined using tables in step 4). For example, when the utilization of the FA or HA is below a specified threshold (e.g., not busy such as when utilization is below 50% or some other suitable utilization rate), the FA or HA may perform processing to update estimated service times of pending I/Os using current service times of tables in FIGS. 7 and 8. In this way, the estimated service times of pending I/Os may be further updated as load of the system may change balanced with available system resources so as not to adversely impact system I/O processing during times of heavy usage/load. In at least one embodiment, when the estimated execution or service time associated with a pending I/O is calculated, the pending I/O's estimated I/O RT and also time delay may also be recalculated such as based on EQUATION 1 and associated processing steps as discussed elsewhere herein. The time delay may be calculated as the difference between the SLO associated with the LUN to which the I/O is directed and the estimated execution or service time for the pending I/O. If the foregoing difference is greater than zero, the difference may be used as the additional time delay denoting the amount of time by which the I/O is further delayed. If the foregoing difference is not greater than zero, then no time delay is added for the I/O.

In at least one embodiment, the I/O RT of the SLO associated with a LUN may be used to determine a "time to become urgent" or TBU value for each I/O directed to the LUN. The TBU value may specify an amount of time, such as a number of microseconds or milliseconds, after which an outstanding pending I/O request becomes urgent. Otherwise, an I/O request may be non-urgent. Urgent requests may be processed with a higher priority than (e.g. may be processed prior to) non-urgent requests. A TBU value may indicate, for example, an age of a request. After an I/O request has been outstanding for a threshold amount of time as indicated by the TBU of the LUN, the I/O request becomes urgent. In connection with TBUs, lowering the TBU raises the priority or service level. For example, the service level of an I/O may be adjusted using TBU values by making the TBU value smaller thereby decreasing the amount of time before the I/O request directed to a LUN is deemed urgent.

Additional details will now be described in connection with an embodiment utilizing TBUs. In such an embodiment, an incoming I/O request may be received from the host, such as by an HA, FA or other director that receives host I/O requests. The received request may be tagged with a time of arrival at the data storage system and a time at which the request becomes urgent (TBU). FIG. 9 illustrates the foregoing as may be associated with a received I/O request 700. A received I/O request may have a time of arrival 710 indicating the time (e.g., timestamp, date and/or wall clock time) at which the request was received by the data storage system. The time at which the request becomes urgent (TBU) 712 may be a time value (e.g., "future" time stamp indicating date and wall clock time or may otherwise denote an absolute amount of time to elapse or transpire after the receiving the request) at which the I/O request becomes urgent. The value in 712 may be determined in accordance with the TBU value defined for the LUN to which the I/O request is directed. For example, if a received I/O request is a read or write request for data from LUN B having a BRONZE SLO=6 ms. I/O RT, a TBU value defined as the I/O RT of the SLO for LUN B is determined. In at least one embodiment, the TBU value of 712 for an I/O request may be the SLO associated with LUN B to which the I/O is directed.

In at least one embodiment, as noted above, the time at which the I/O request becomes urgent (e.g., TBU 712 for the I/O request) may be the SLO of the LUN to which the I/O request is directed. For example, for the I/O request directed to LUN B with BRONZE SLO=6 ms, the TBU 712 for the I/O request may be 6 ms. In this case, the TBU 712=6 ms. denoting an absolute amount of time that the I/O request has to complete prior to becoming urgent. In other words, after 6 ms. from the time of arrival 710 of the I/O request, the I/O request becomes urgent. Periodically (e.g., every 1 ms. time period), processing may be performed by a component, such as the FA or HA managing one or more queues of pending I/O requests, that includes adjusting the TBU values of the pending I/O requests. For example, at every 1 ms. time period that elapses, the FA or HA may decrease each TBU value 712 of each pending I/O request by 1 ms.

As a variation to the foregoing the TBU value 712 of a pending I/O request may be determined by adding the SLO of the LUN to which the I/O is directed to the time of arrival 710. In this case, the TBU 712 of an I/O request denotes a future timestamp or time value (e.g., date and time in terms of wall clock time) at which the I/O request becomes urgent. In this latter variation, the FA or HA does not need to update TBU values 712 of pending I/O requests. As the current time advances as time elapses, an I/O request is considered urgent if the current time>TBU 712 of the I/O request.

As yet another variation, an embodiment may omit field 712 for each I/O request (e.g., not tag each I/O request with a TBU value 712) and may perform the calculation at runtime for determining whether an I/O request is considered urgent using field 710 and the target I/O RT SLO of the LUN to which the I/O is directed. In such an embodiment, for example, an I/O request is considered urgent if the current time minus the time of arrival 710 (of I/O request) is greater than the SLO of the LUN to which the IO is directed.

As described herein, an estimated service or execution time 711 (e.g., as determined using tables in step 4) and an additional artificial time delay 713 may be calculated for a received I/O. For example, as described elsewhere herein, the data storage system may calculate the difference between the SLO RT target associated with the new I/O and the expected RT for the new I/O to determine the artificial time delay, if any, to be added to this new I/O's RT to meet the SLO RT target. In at least one embodiment, a time delay value may be placed in 713 for the new I/O only if the expected RT for the new I/O is less than the SLO RT target of the LUN to which the new I/O is directed (e.g., only introduce additional time delay equal to the foregoing difference of SLO RT—expected/estimated RT for new I/O if the difference calculated is greater than zero, or a positive value).

Generally, element 714 may represent other I/O request information not specifically illustrated in FIG. 9 that may be optionally associated with each queued I/O.

Once the I/O request has been tagged with the time of arrival 710, the time at which the request becomes urgent 712, the estimated service or execution time 711, the time delay 713, and other I/O request information 714, the I/O request may be placed on a queue, such as a front end queue managed by the FA or HA that received the I/O request, to await servicing. The FA or HA may perform processing in connection with a received I/O request.

Figure 10:
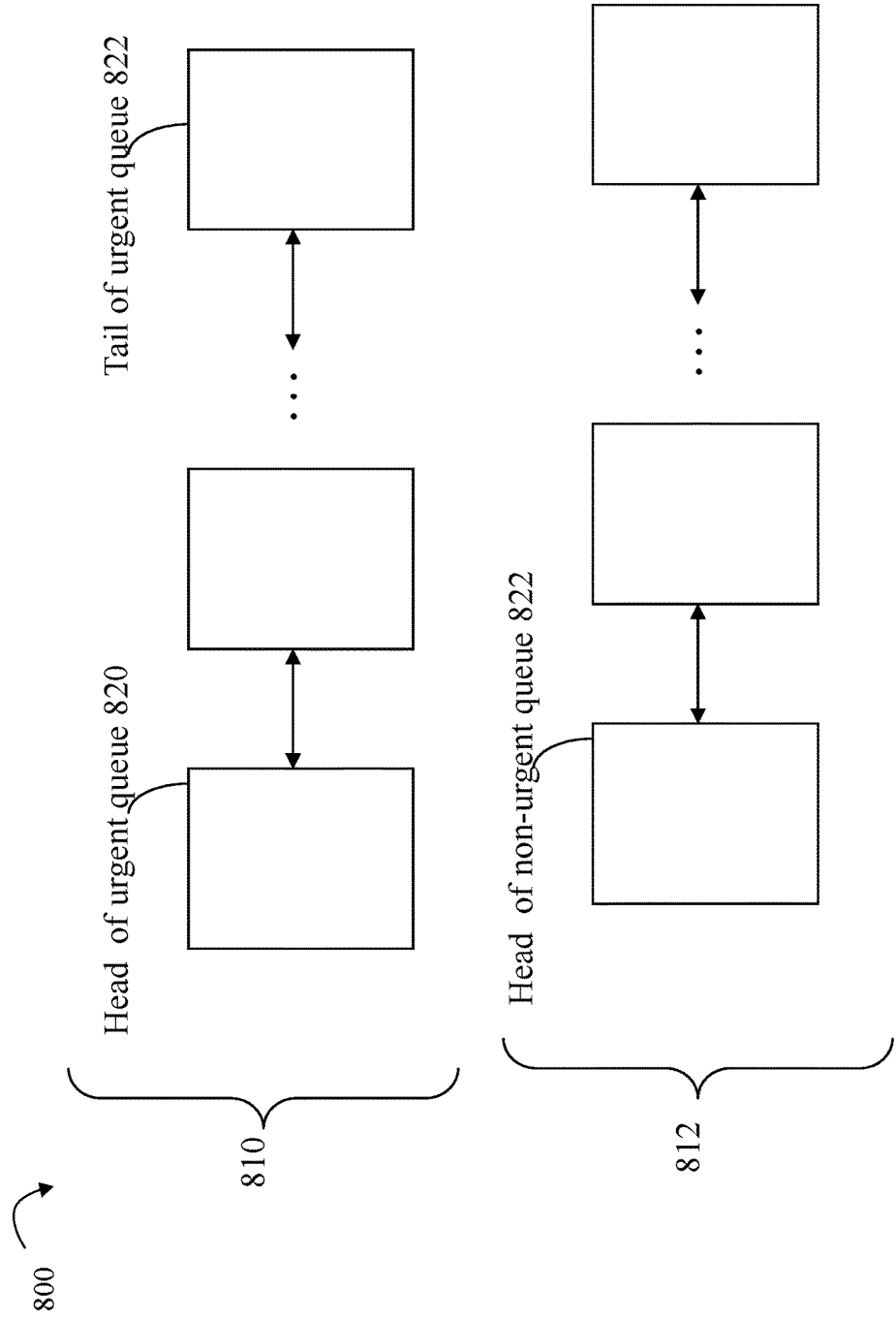
FIG. 10 is an example illustrating urgent and non-urgent queues that may be used in an embodiment in accordance with techniques herein.

Referring to FIG. 10, shown is an example of the queues that may be utilized by a component, such as an HA or FA, in an embodiment, in connection with a received I/O request. In at least one embodiment, each HA or FA may maintain its own set of queues as illustrated in the example 800 of FIG. 10. The FA or HA may maintain an urgent request queue 810 and a non-urgent request queue 812. The FA may determine if the received I/O request is urgent, for example, in accordance with the value in field 712. In at least one embodiment as noted above in which the value indicated in TBU 712 denotes a future time stamp at which the request becomes urgent, if the current time is at, or later than, the value indicated in 712, then at which the request becomes urgent has passed. In an alternate embodiment in which value indicated in 712 is an absolute value (initially assigned the value of the SLO of the LUN to which the I/O is directed where the TBU value is periodically decremented by an amount of elapsed time since arrival), the I/O request becomes urgent when its associated TBU value 712 is zero.

Accordingly, when a request is deemed urgent, the request is placed in queue 810. Otherwise, the request may be deemed non-urgent and placed in the queue 812. The position at which newly added requests are added to each queue 810 and 812 may vary with each embodiment. For example, an embodiment may manage queue 812 by keeping the queue 812 sorted in accordance with increasing values for field 712 (e.g., time at which a request becomes urgent). Periodically, the FA or HA may move elements from non-urgent queue 812 to urgent queue 810 as I/O requests become urgent in accordance with values of field 712 associated with each I/O request. I/O requests may be added to urgent queue 810 by placing new I/O requests at the front or head 820 of the queue. Urgent requests may be serviced on a FIFO (first in first out) basis by selecting a next urgent request from the tail 822 of the urgent queue for processing. Other embodiments may use other techniques in connection with management of queues 810 and 812.

It should be noted that each of the queues 810 and 812 may be implemented using any one of a variety of different data structures such as, for example, doubly linked lists, singly linked list, arrays, and the like.

An embodiment may service the urgent I/O requests using any one of a variety of different techniques giving higher processing priority to urgent requests over non-urgent request. For example, an embodiment may process all urgent requests prior to processing any non-urgent request. In another embodiment, a selected number of urgent requests, N, may be processed for each non-urgent request processed. The foregoing are a few examples of the policies that may be utilized in embodiment to give processing priority to urgent requests as described herein.

Referring back to FIG. 9, an embodiment may use other techniques and record other information in connection with tracking and determining when an I/O request becomes urgent. For example, rather than have 2 queues 810 and 812 as in FIG. 9, an embodiment may have a single queue where pending I/O requests of the single queue are sorted by TBU values 712 associated with the queued pending I/O requests.

Figure 11:
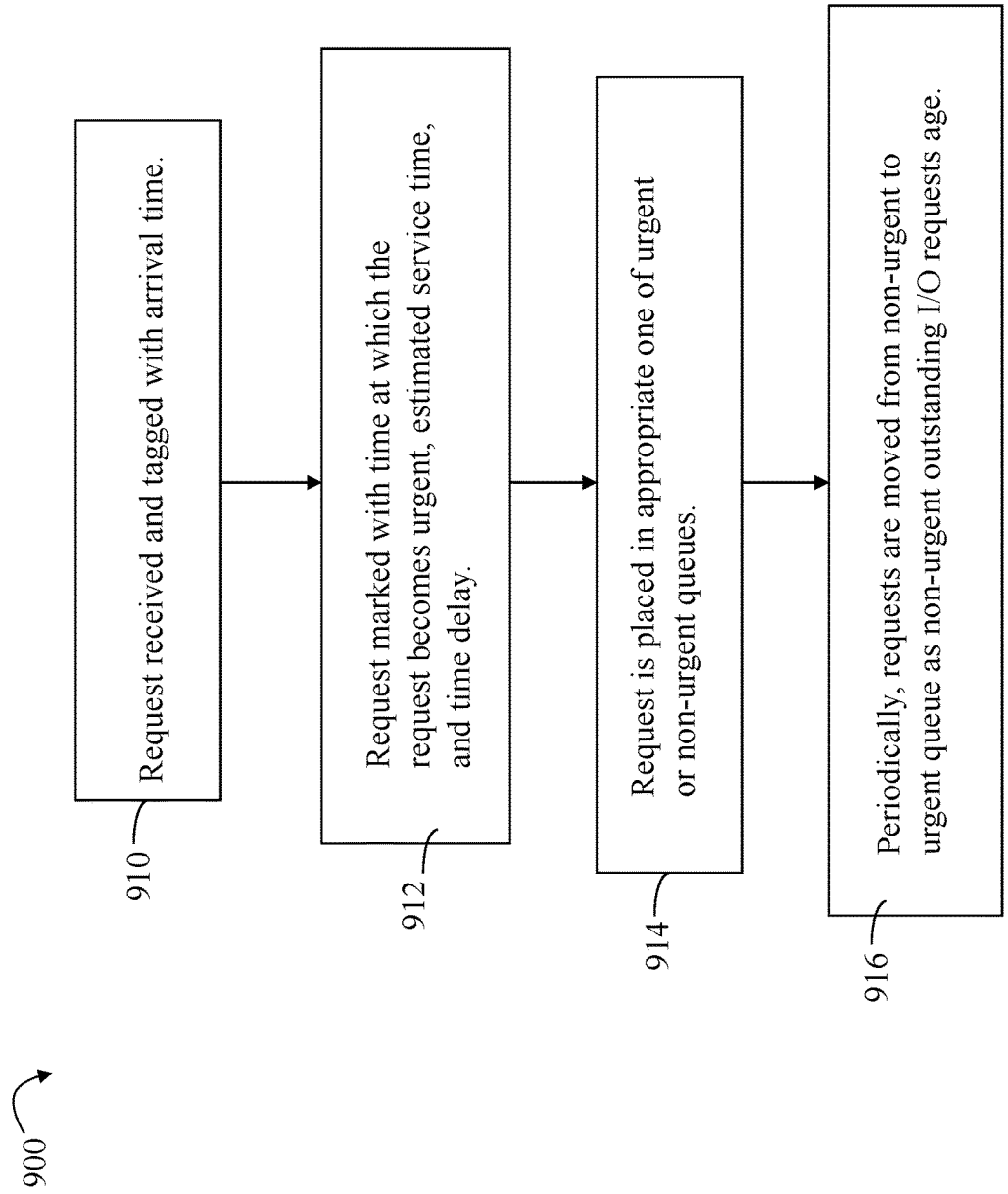
FIGS. 11, 12, 13, 14 and 15 are flowcharts of processing steps that may be performed in an embodiment in accordance with techniques herein.

Referring to FIG. 11, shown is a flowchart 900 of processing steps that may be performed in an embodiment in connection with processing received I/O requests. At step 910, the received I/O request is tagged with the arrival time. At step 912, the request is marked with the time at which the request becomes urgent, an estimated service time, and time delay. At step 914, the I/O request is placed in the appropriate one of the urgent or non-urgent queues for processing. At step 916, the HA or FA may periodically move requests from the non-urgent queue to the urgent queue as the non-urgent outstanding I/O requests age. As described above, any one of a variety of different techniques may be used to process the urgent I/O requests in a prioritized manner with respect to the non-urgent I/O requests.

Figures 12, 13:
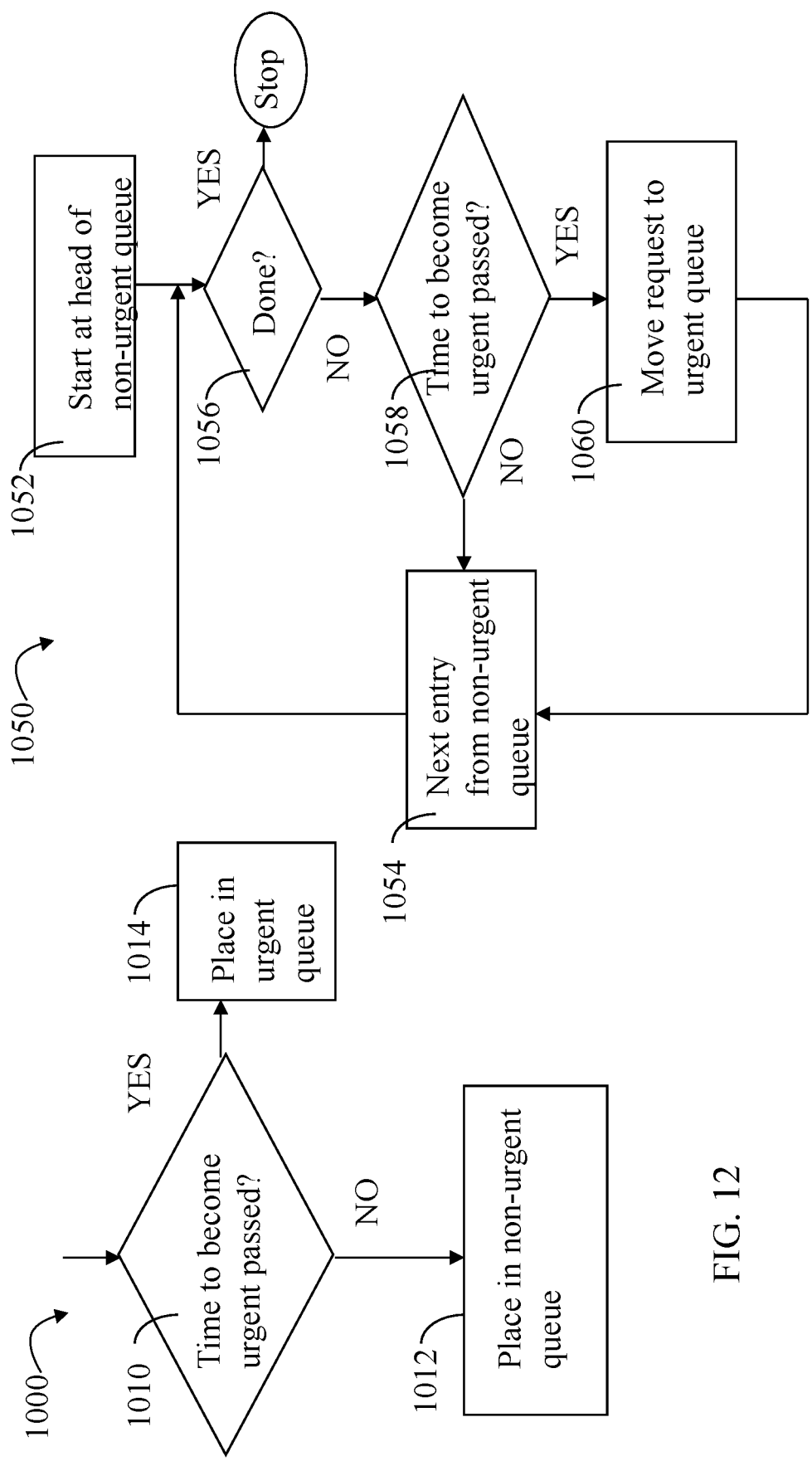

Referring to FIG. 12, shown is a flowchart 1000 including processing steps that may be performed in an embodiment by an HA or FA in connection with queuing a newly received I/O request. At step 1010, a determination is made as to whether the time to become urgent associated with the I/O request has passed. If so, control proceeds to step 1014 to place the I/O request on the urgent queue. Otherwise, control proceeds to step 1012 the place the requests in a non-urgent queue.

Referring to FIG. 13, shown is a flowchart 1050 including processing steps that may be periodically performed in an embodiment by the FA or HA managing the pending I/O queues to move I/O requests from the non-urgent queue to the urgent queue as I/O requests age. At step 1052, processing starts at the head of the non-urgent queue. At step 1056, a determination is made as to whether all I/O requests on the non-urgent queue have been examined. If so, processing stops. Otherwise, control proceeds to step 1058 to determine if, for the current I/O request examined on the non-urgent queue, has the time to become urgent for the current I/O request passed. If so, control proceeds to step 1060 to move the request to the urgent queue and then control proceeds to step 1054 to process the next entry of the non-urgent queue. If step 1058 evaluates to no, control proceeds directly to step 1054. From step 1054, control proceeds to step 1056.

In at least one embodiment in accordance with techniques herein, I/Os directed to LUNs having the highest service level of DIAMOND may be scheduled for immediate service or execution by placing such I/Os on the urgent queue when received. For I/Os having an associated DIAMOND service level, the processing as described above to determine an estimated RT may be omitted where the I/O is immediately placed into the urgent queue. In such an embodiment, all other I/Os directed to LUNs having lower service levels, such as GOLD and BRONZE, may have processing performed as described above to determine the estimated RT for such I/Os where such I/Os may then be placed into the non-urgent queue. In at least one embodiment, the I/Os may be placed into the non-urgent queue at a particular position based on the values of field 712 associated with the queued I/Os. In at least one embodiment, the non-urgent queue may be sorted based on increasing values of field 712 with the highest priority I/Os denoted as those having the lowest time values of 712 (e.g., becoming urgent before other queues I/Os having higher time values in 712).

Figure 14:
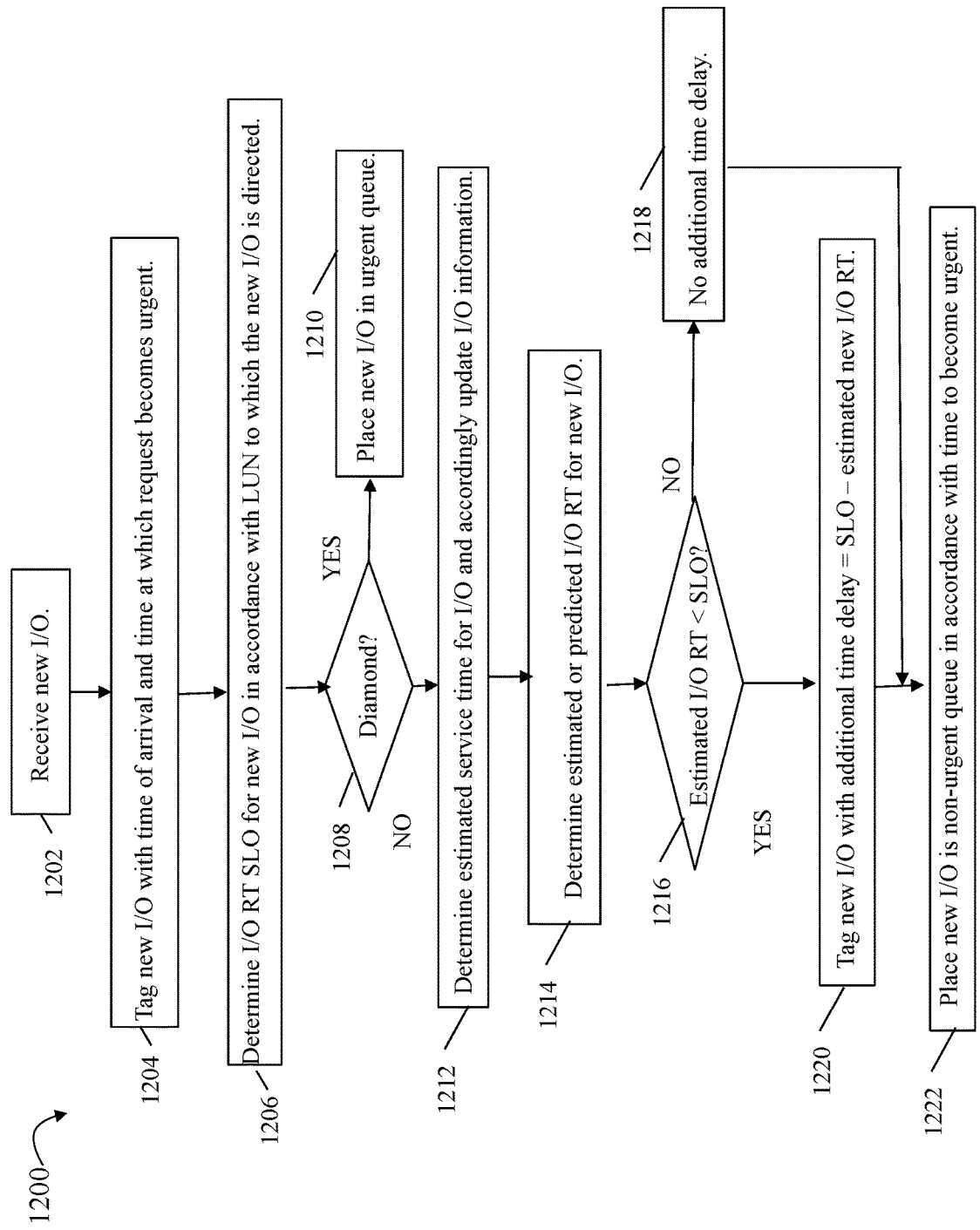

Referring to FIG. 14, shown is a flowchart 1200 of processing that may be performed in an embodiment in accordance with techniques herein for processing a received new I/O request. FIG. 14 processing may generally be performed in efforts to meet all defined SLO targets and to prevent overutilization of resources by the I/Os directed to LUNs having various defined service levels with the understanding that there may be no upper limits or overutilization associated with the highest service level of DIAMOND. The flowchart 1200 outlines processing that may be performed in an embodiment having multiple service levels each with a different target I/O RT SLO, such as DIAMOND, GOLD and BRONZE described elsewhere herein. The flowchart 1200 processing may be performed, for example, to improve performance for I/Os directed to one or more LUNs having a DIAMOND SLO whereby all other I/Os directed to other LUNs having lower service ranked SLOs of GOLD or BRONZE may have an additional time delay added in efforts to improve the measured I/O RT performance of the DIAMOND LUNs. As will be appreciated by those skilled in the art, the steps of 1200 may be generalized for use with other service levels having a generalized service level ranking, from highest to lowest, where efforts to increase performance of a first of the service levels may be achieved by introducing additional time delays for I/Os directed to LUNs having service levels ranked lower than the first service level in service level ranking. For example, such general processing may modify step 1216 (discussed below) to include an additional condition check where control proceeds to step 1218 (discussed below) only when the estimated I/O RT of the new I/O<the new I/Os SLO and also when the new I/O's SLO is ranked lower in service level ranking than the SLO for which performance is being improved.

At step 1202, a new I/O is received. From step 1202, control proceeds to step 1204 where the new I/O is tagged with the time of arrival and time at which the request becomes urgent. From step 1204, control proceeds to step 1206 where the I/O RT SLO for the new I/O is determined in accordance with the LUN to which the new I/O is directed. From step 1206, control proceeds to step 1208 where a determination is made as to whether the I/O is associated with the DIAMOND SLO. If step 1208 evaluates to yes, control proceeds to step 1210 to place the new I/O in the urgent queue. It should be noted that the DIAMOND SLO has a time delay of 0. If step 1208 evaluates to no, control proceeds to step 1212 to determine the estimated service time for the I/O and accordingly update the I/O information. From step 1212, control proceeds to step 1214 to determine the estimated or predicted I/O RT for the new I/O. Step 1212 may include processing as described in connection with Step 4 above. Step 1214 may be performed based on processing steps as described above such as associated with EQUATION 1. From step 1214, a determination is made in step 1216 as to whether the estimated I/O RT for the new I/O is less than the SLO (as determined in step 1206). If step 1216 evaluates to no, control proceeds to step 1218 where no additional time delay is determined for the new I/O. From step 1218, control proceeds to step 1222. If step 1216 evaluates to yes, control proceeds to step 1220 where the new I/O is tagged with an additional time delay equal to the mathematical difference between the SLO and the estimated new I/O RT. From step 1220, control proceeds to step 1222. In step 1222, the new I/O is placed in the non-urgent I/O queue in accordance with the new I/O's time to become urgent (as determined in step 1204).

Consistent with discussion herein, pending I/Os are removed from the urgent queue 810 of FIG. 10 for processing to service or execute the requested I/O operation. Consistent with discussion elsewhere herein, an I/O may be further additionally delayed by an amount of time indicated by the time delay field 713 of the I/O. The time delay may be injected or introduced using any suitable technique to prolong or extend the RT for the I/O operation. For example, in at least one embodiment, the time delay may be injected or introduced subsequent to completing the servicing or execution of the I/O. Once the I/O execution or servicing is complete, processing includes further delaying returning a response/acknowledgement to the host or other client regarding completion of the I/O by an amount of time denoted by field 713 of the I/O request.

Figure 15:
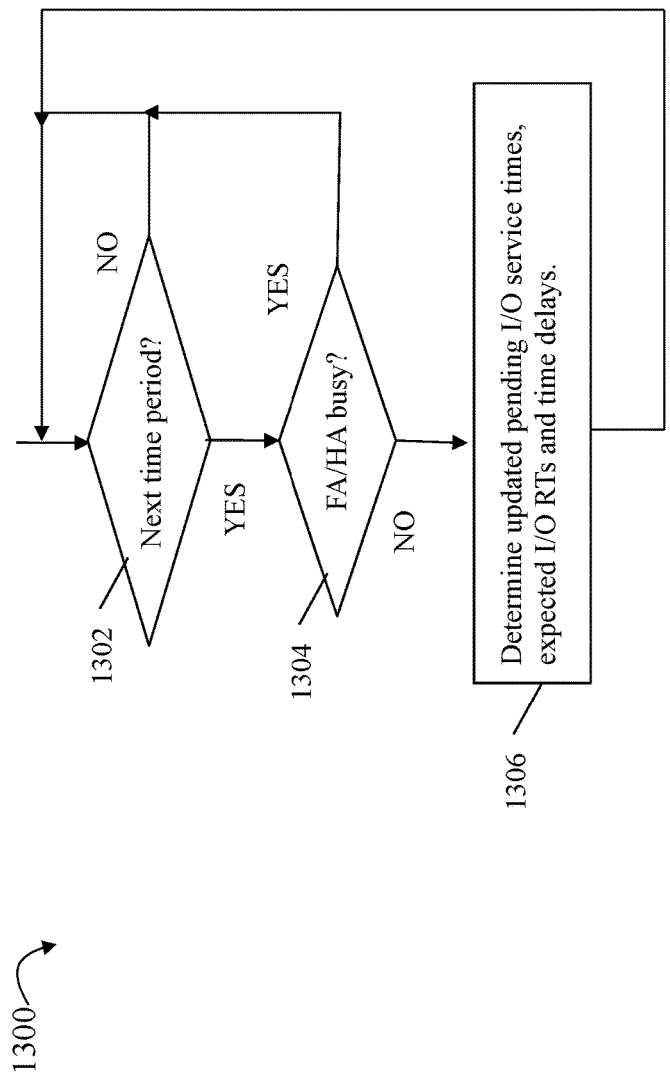

Referring to FIG. 15, shown is a flowchart 1300 of processing steps that may be performed by a component, such as an HA or FA, managing pending I/O queues, such as illustrated in FIG. 10. At step 1302, a determination is made as to whether the current time indicates another time period has elapsed. Processing remains in step 1302 until the next time period has elapsed. Once step 1302 evaluates to yes, control proceeds to step 1304. In step 1304, a determination is made as to whether the FA or HA is busy. In at least one embodiment, step 1304 may be performed by determining whether the current activity level (e.g., component utilization) of the FA or HA exceeds a specified threshold level of activity (e.g., threshold percentage of utilization). If step 1304 evaluates to yes, control proceeds to step 1302 to wait for the next elapsed time period. If step 1304 evaluates to no, control proceeds to step 1306. In step 1306, processing may be performed by the FA or HA to determine updated pending I/O service times, expected I/O RTs and time delays for I/Os included in the FA or HA's pending I/O queue, such as the non-urgent pending I/O queue. From step 1306, control proceeds to step 1302 to wait for the next elapsed time period.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   receiving an I/O operation directed to a logical device having an associated service level objective with a target I/O response time;
   performing first processing that determines an estimated response time for the I/O operation, the first processing including:
      determining a first time denoting a fixed baseline amount of time for the I/O operation;
      determining a second time denoting a cumulative amount of time estimated to service pending I/O operation queued for service prior to the I/O operation;
      determining a third time denoting an expected service time estimated for servicing the I/O operation; and
      determining the estimated response time for the I/O operation as a sum of the first time, the second time and the third time;
   determining, based on the estimated response time for the I/O operation and the associated service level objective, whether to delay the I/O operation by an additional amount of time thereby increasing a measured response time for the I/O operation by the additional amount, wherein the second time is determined in accordance with a number of pending I/O operations queued for execution or servicing prior to the I/O operation and an estimated service time associated with each of the pending I/O operations;
   maintaining a plurality of average service times, wherein each of the plurality of average service times denotes an average service time for servicing I/O operations of a particular I/O type and a particular I/O size externally outside of the data storage system; and
   determining the estimated service time associated with at least one of the pending I/O operations using a selected one of the plurality of average service times having an I/O type and an I/O size matching an I/O type and an I/O size of said at least one pending I/O operation.

2. The method of claim 1, wherein the I/O operation is received at a data storage system from a host.

3. The method of claim 2, wherein the first time includes an internal baseline time for servicing the I/O operation within the data storage system.

4. The method of claim 3, wherein the I/O operation has an associated I/O type and I/O size, and wherein the internal baseline time is selected, in accordance with the I/O type and the I/O size, from a table of internal baseline times.

5. The method of claim 4, wherein the associated type is one of read hit, read miss or write.

6. The method of claim 3, wherein the first time includes an external baseline time for transmitting the I/O operation and associated I/O operation data between the host and data storage system.

7. The method of claim 6, wherein the I/O operation has an associated I/O type and I/O size, and wherein the external baseline time is selected, in accordance with the I/O type and the I/O size, from a table of external baseline times.

8. The method of claim 7, wherein the I/O type is one of read or write.

9. The method of claim 3, further comprising:
maintaining a first plurality of average service times, wherein each of the first plurality of average service times denotes an average service time for servicing I/O operations of a particular I/O type and a particular I/O size within the data storage system; and
determining the estimated service time associated with each of the pending I/O operations using a selected one of the first plurality of average service times having an I/O type and an I/O size matching an I/O type and an I/O size of said each pending I/O operation.

10. The method of claim 9, wherein the third time denoting an expected service time estimated for servicing the I/O operation is determined using a selected one of the first plurality of average service times having an I/O type and an I/O size matching an I/O type and an I/O size of said I/O operation.

11. The method of claim 2, wherein said determining, based on the estimated response time for the I/O operation and the associated service level objective, whether to delay the I/O operation by an additional amount of time thereby increasing a measured response time for the I/O operation by the additional amount further comprises:
determining whether the estimated response time for the I/O operation is less than the associated service level objective; and
responsive to determining the estimated response time for the I/O operation is less than the associated service level, determining to delay the I/O operation by an additional amount of time equal to a difference between the associated service level and the estimated response time for the I/O operation.

12. The method of claim 11, further comprising:
sending a response to the host after servicing the I/O operation, and wherein the data storage system delays sending the response by the additional amount of time.

13. A method of processing I/O operations comprising:
receiving an I/O operation directed to a logical device having an associated service level objective with a target I/O response time;
performing first processing that determines an estimated response time for the I/O operation, the first processing including:
determining a first time denoting a fixed baseline amount of time for the I/O operation;
determining a second time denoting a cumulative amount of time estimated to service pending I/O operation queued for service prior to the I/O operation;
determining a third time denoting an expected service time estimated for servicing the I/O operation; and
determining the estimated response time for the I/O operation as a sum of the first time, the second time and the third time; and
determining, based on the estimated response time for the I/O operation and the associated service level objective, whether to delay the I/O operation by an additional amount of time thereby increasing a measured response time for the I/O operation by the additional amount, wherein the associated service level of the I/O operation is included in a service level ranking of a plurality of service levels, a first logical device has a first service level of the service level ranking, and wherein the first service level is ranked higher than the associated service level of the logical device to which the I/O operation is directed, and the method comprising:
determining the first logical device has a measured response time exceeding a target response time of the first service level; and
performing processing to improve performance of the first logical device having the first service level by delaying I/O operations directed to other logical devices, including the logical device, having associated service levels ranked lower than the first service level in the service level ranking.

14. A system comprising:
at least one processor; and
a memory comprising code stored thereon that, when executed, performs a method of processing I/O operations comprising:
receiving an I/O operation directed to a logical device having an associated service level objective with a target I/O response time;
performing first processing that determines an estimated response time for the I/O operation, the first processing including:
determining a first time denoting a fixed baseline amount of time for the I/O operation;
determining a second time denoting a cumulative amount of time estimated to service pending I/O operation queued for service prior to the I/O operation;
determining a third time denoting an expected service time estimated for servicing the I/O operation; and
determining the estimated response time for the I/O operation as a sum of the first time, the second time and the third time;
determining, based on the estimated response time for the I/O operation and the associated service level objective, whether to delay the I/O operation by an additional amount of time thereby increasing a measured response time for the I/O operation by the additional amount, wherein the second time is determined in accordance with a number of pending I/O operations queued for execution or servicing prior to the I/O operation and an estimated service time associated with each of the pending I/O operations;
maintaining a plurality of average service times, wherein each of the plurality of average service times denotes an average service time for servicing I/O operations of a particular I/O type and a particular I/O size externally outside of the data storage system; and
determining the estimated service time associated with at least one of the pending I/O operations using a selected one of the plurality of average service times having an I/O type and an I/O size matching an I/O type and an I/O size of said at least one pending I/O operation.

15. A non-transitory computer readable medium comprising code stored thereon that, when executed, performs a method of processing I/O operations comprising:
receiving an I/O operation directed to a logical device having an associated service level objective with a target I/O response time;
performing first processing that determines an estimated response time for the I/O operation, the first processing including:

determining a first time denoting a fixed baseline amount of time for the I/O operation;

determining a second time denoting a cumulative amount of time estimated to service pending I/O operation queued for service prior to the I/O operation;

determining a third time denoting an expected service time estimated for servicing the I/O operation; and determining the estimated response time for the I/O operation as a sum of the first time, the second time and the third time;

determining, based on the estimated response time for the I/O operation and the associated service level objective, whether to delay the I/O operation by an additional amount of time thereby increasing a measured response time for the I/O operation by the additional amount, wherein the second time is determined in accordance with a number of pending I/O operations queued for execution or servicing prior to the I/O operation and an estimated service time associated with each of the pending I/O operations;

maintaining a plurality of average service times, wherein each of the plurality of average service times denotes an average service time for servicing I/O operations of a particular I/O type and a particular I/O size externally outside of the data storage system; and determining the estimated service time associated with at least one of the pending I/O operations using a selected one of the plurality of average service times having an I/O type and an I/O size matching an I/O type and an I/O size of said at least one pending I/O operation.

16. The non-transitory computer readable medium of claim 15, wherein the I/O operation is received at a data storage system from a host.

17. The non-transitory computer readable medium of claim 16, wherein the first time includes an internal baseline time for servicing the I/O operation within the data storage system, and wherein the first time includes an external baseline time for transmitting the I/O operation and associated I/O operation data between the host and data storage system.

18. The non-transitory computer readable medium of claim 17, wherein the internal baseline time and the external baseline time are determined in accordance with an I/O type and I/O size of the I/O operation.

19. A non-transitory computer readable medium comprising code stored thereon that, when executed, performs a method of processing I/O operations comprising:

receiving an I/O operation directed to a logical device having an associated service level objective with a target I/O response time;

performing first processing that determines an estimated response time for the I/O operation, the first processing including:

determining a first time denoting a fixed baseline amount of time for the I/O operation;

determining a second time denoting a cumulative amount of time estimated to service pending I/O operation queued for service prior to the I/O operation;

determining a third time denoting an expected service time estimated for servicing the I/O operation; and determining the estimated response time for the I/O operation as a sum of the first time, the second time and the third time; and determining, based on the estimated response time for the I/O operation and the associated service level objective, whether to delay the I/O operation by an additional amount of time thereby increasing a measured response time for the I/O operation by the additional amount, wherein the associated service level of the I/O operation is included in a service level ranking of a plurality of service levels, a first logical device has a first service level of the service level ranking, and wherein the first service level is ranked higher than the associated service level of the logical device to which the I/O operation is directed, and the method comprising:

determining the first logical device has a measured response time exceeding a target response time of the first service level; and performing processing to improve performance of the first logical device having the first service level by delaying I/O operations directed to other logical devices, including the logical device, having associated service levels ranked lower than the first service level in the service level ranking.

20. A system comprising:

one or more processors; and a memory comprising code stored thereon that, when executed, perform a method of processing I/O operations comprising:

receiving an I/O operation directed to a logical device having an associated service level objective with a target I/O response time;

performing first processing that determines an estimated response time for the I/O operation, the first processing including:

determining a first time denoting a fixed baseline amount of time for the I/O operation;

determining a second time denoting a cumulative amount of time estimated to service pending I/O operation queued for service prior to the I/O operation;

determining a third time denoting an expected service time estimated for servicing the I/O operation; and determining the estimated response time for the I/O operation as a sum of the first time, the second time and the third time; and determining, based on the estimated response time for the I/O operation and the associated service level objective, whether to delay the I/O operation by an additional amount of time thereby increasing a measured response time for the I/O operation by the additional amount, wherein the associated service level of the I/O operation is included in a service level ranking of a plurality of service levels, a first logical device has a first service level of the service level ranking, and wherein the first service level is ranked higher than the associated service level of the logical device to which the I/O operation is directed, and the method comprising:

determining the first logical device has a measured response time exceeding a target response time of the first service level; and performing processing to improve performance of the first logical device having the first service level by delaying I/O operations directed to other logical devices, including the logical device, having associated service levels ranked lower than the first service level in the service level ranking.

* * * * *